United States Patent
Tamaki et al.

(10) Patent No.: US 9,223,169 B2
(45) Date of Patent: Dec. 29, 2015

(54) DISPLAY DEVICE

(71) Applicant: Japan Display Inc., Tokyo (JP)

(72) Inventors: Masaya Tamaki, Tokyo (JP); Masashi Mitsui, Tokyo (JP); Yoko Fukunaga, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/749,006

(22) Filed: Jun. 24, 2015

(65) Prior Publication Data

US 2015/0293400 A1   Oct. 15, 2015

Related U.S. Application Data

(63) Continuation of application No. 14/155,872, filed on Jan. 15, 2014, now Pat. No. 9,091,877.

(30) Foreign Application Priority Data

Jan. 16, 2013   (JP) .................................. 2013-005817

(51) Int. Cl.
*G02F 1/1335* (2006.01)
*G02B 5/02* (2006.01)

(52) U.S. Cl.
CPC ........ *G02F 1/133504* (2013.01); *G02B 5/0257* (2013.01); *G02F 1/133553* (2013.01); *G02F 1/133555* (2013.01)

(58) Field of Classification Search
CPC ..................... G02F 1/133553; G02F 1/133555
See application file for complete search history.

(56) References Cited

FOREIGN PATENT DOCUMENTS

| JP | 2000-297110 | 10/2000 |
|----|-------------|---------|
| JP | 2008-239757 | 10/2008 |

*Primary Examiner* — Phu Vu
(74) *Attorney, Agent, or Firm* — K&L Gates LLP

(57) ABSTRACT

A display device includes a reflective image display unit having a sheet-like anisotropic scattering member. The sheet-like anisotropic scattering member has a surface in which both a low refractive index area and a high refractive index area exist. The sheet-like anisotropic scattering member is disposed so that a light enters from a first surface thereof and exits as scattered light from a second surface thereof, when an extent of refractive index difference at a boundary or vicinity thereof between the low refractive index area and the high refractive index area is relatively large in the first surface and relatively small in the second surface.

13 Claims, 16 Drawing Sheets

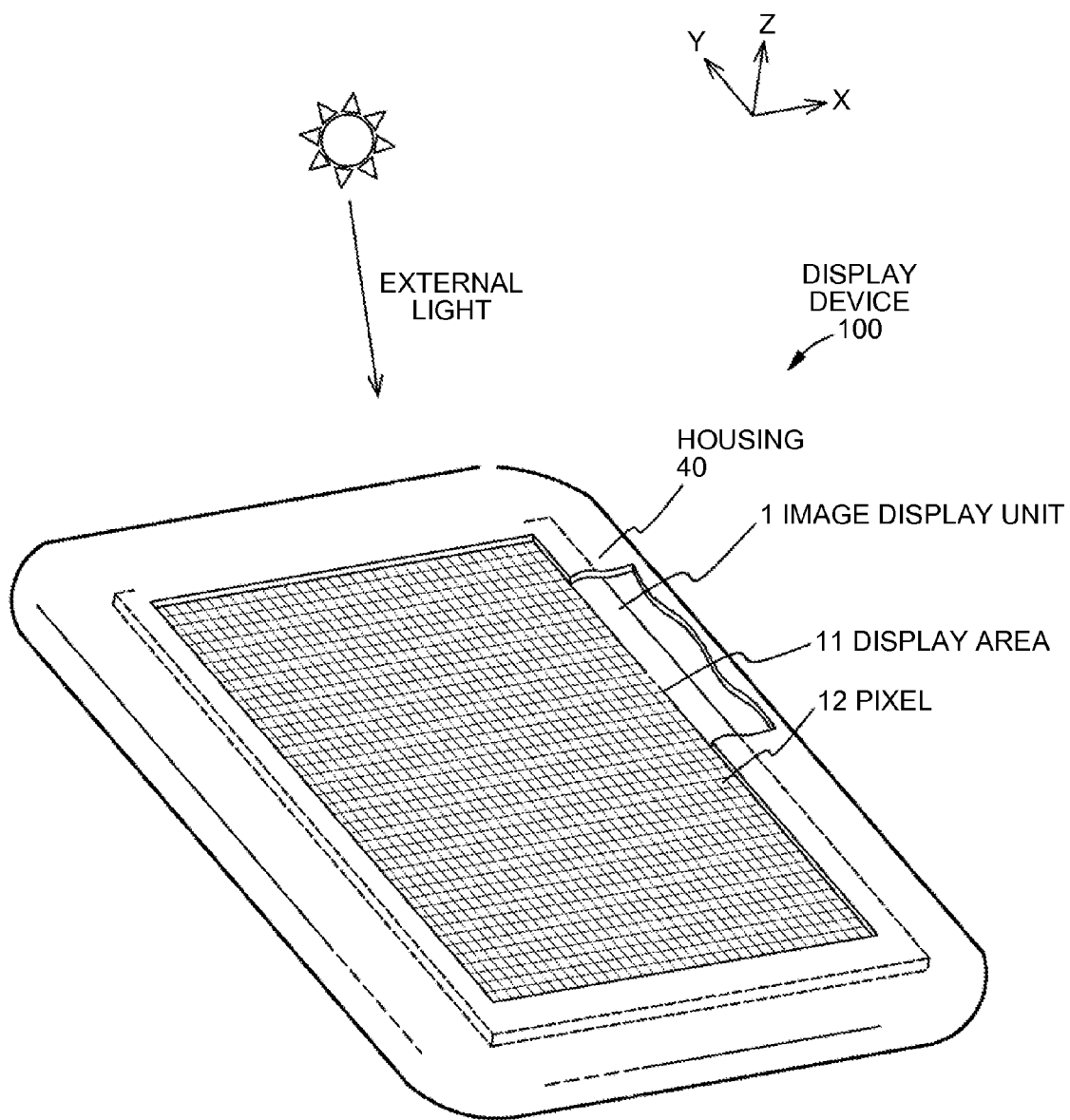

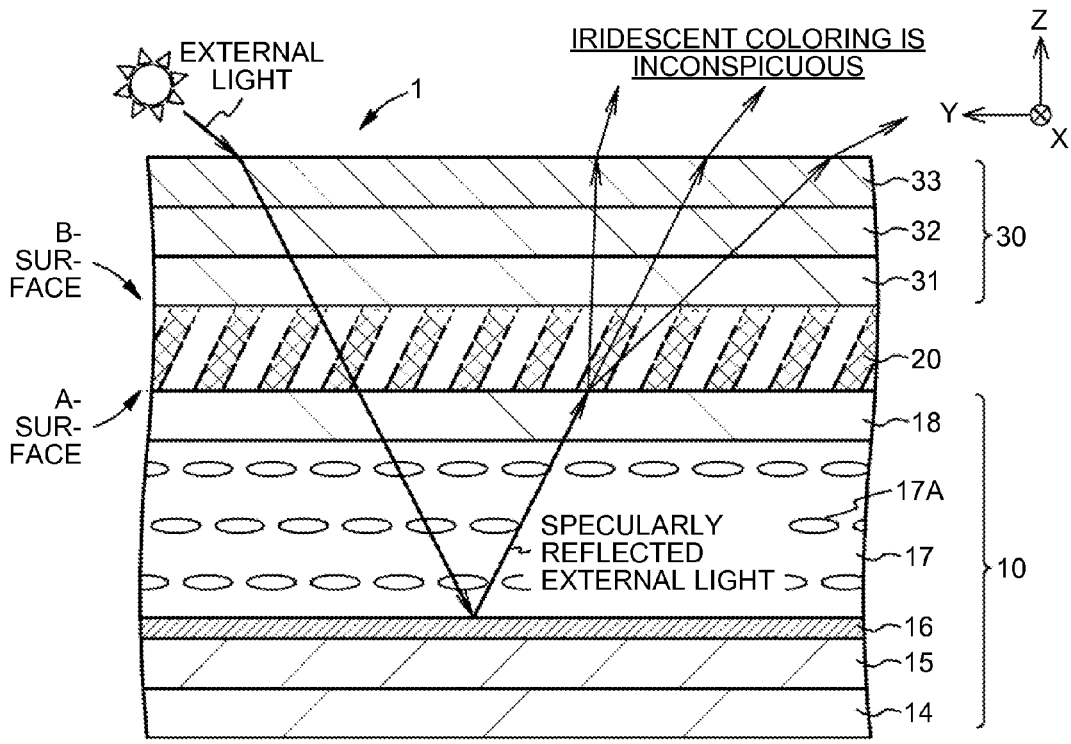
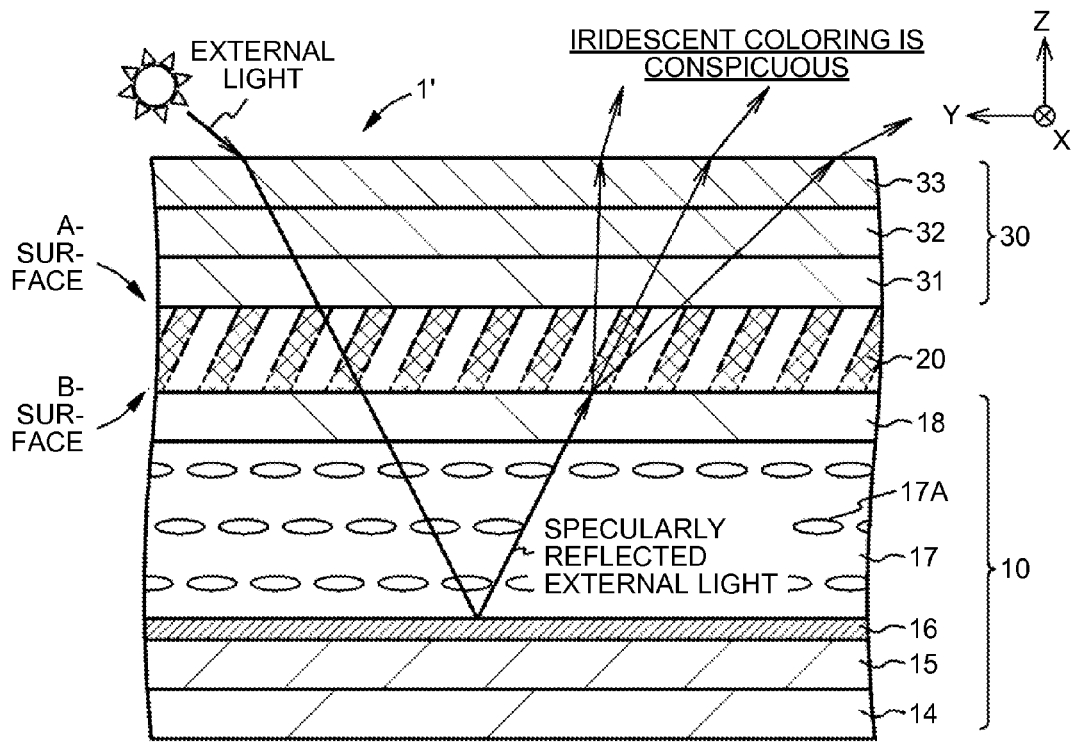

DISPLAY DEVICE

CROSS REFERENCES TO RELATED APPLICATIONS

The present application is a continuation application of U.S. patent application Ser. No. 14/155,872, filed Jan. 15, 2014, which application claims priority to Japanese Priority Patent Application JP 2013-005817 filed in the Japan Patent Office on Jan. 16, 2013, the entire content of which is hereby incorporated by reference.

BACKGROUND

1. Field of the Invention

The present disclosure relates to a display device, and more specifically to a display device including an image display unit provided with a sheet-like anisotropic scattering member.

2. Description of the Related Art

There is known a reflective image display unit that displays an image by controlling the reflection ratio of external light or incident light. A reflective liquid crystal display panel, for example, includes a reflecting electrode that reflects incident light. The reflective liquid crystal display panel displays an image by controlling the reflection ratio of incident light with a liquid crystal material layer. Since a display device including such a reflective image display unit uses incident light from outside to display an image, it is possible to save the power consumption and reduce in its weight and thickness. Such display devices are used for portable electronic apparatuses, for example.

In such a display device including a reflective image display unit, it is possible to increase the reflection ratio for a given observation point and thus compensate for the reduction of reflection ratio in color displaying, by imparting an angle dependency to the light scattering property or characteristics in a display area of the image display unit. It is also possible to prevent an image from being seen or observed at or from a point other than a given observation point. For example, Japanese Patent Application Laid-open Nos. 2000-297110 and 2008-239757 describe an anisotropic scattering member with a plurality of areas having different refractive indexes which may be used for controlling a viewing angle of the display device.

In a display device employing such an anisotropic scattering member, an adverse iridescence such as rainbow-colored glare may occur because of optical interference due to a microstructure of the anisotropic scattering member. Thus, a display quality may be deteriorated.

Therefore, there is a need for a display device capable of reducing iridescence (ex. rainbow-colored glare) which may occur due to a structure of an anisotropic scattering member.

SUMMARY

It is an object of the present invention to at least partially solve the problems in the conventional technology.

There is provided a display device including a reflective image display unit having a sheet-like anisotropic scattering member, wherein the sheet-like anisotropic scattering member has a surface in which both a low refractive index area and a high refractive index area exist, the sheet-like anisotropic scattering member is disposed so that a light enters from a first surface of the sheet-like anisotropic scattering member and exits as scattered light from a second surface of the sheet-like anisotropic scattering member, when an extent of refractive index difference at a boundary or vicinity thereof between the low refractive index area and the high refractive index area is relatively large in the first surface and relatively small in the second surface, and the display device satisfies mathematical formulae, $0.7 < T(\theta-\phi)/T(\theta) \leq 1$ $\theta < 0$ wherein $2\phi$ represents a scattering angle range, $\theta$ represents a predetermined main incident angle of light entering the scattering member, $T(a)$ represents a transmittance at a position on an extension line of an incident direction of the light with an incident angle "a".

The above and other objects, features, advantages and technical and industrial significance of this invention will be better understood by reading the following detailed description of presently preferred embodiments of the invention, when considered in connection with the accompanying drawings.

Additional features and advantages are described herein, and will be apparent from the following Detailed Description and the figures.

BRIEF DESCRIPTION OF THE FIGURES

FIG. 1 is a schematic perspective view of a display device according to a first embodiment;

FIG. 6A is a schematic sectional view of the reflective image display unit according to the first embodiment;

FIG. 6B is a schematic sectional view of a reflective image display unit according to a comparative embodiment;

DETAILED DESCRIPTION

Figure 2A:
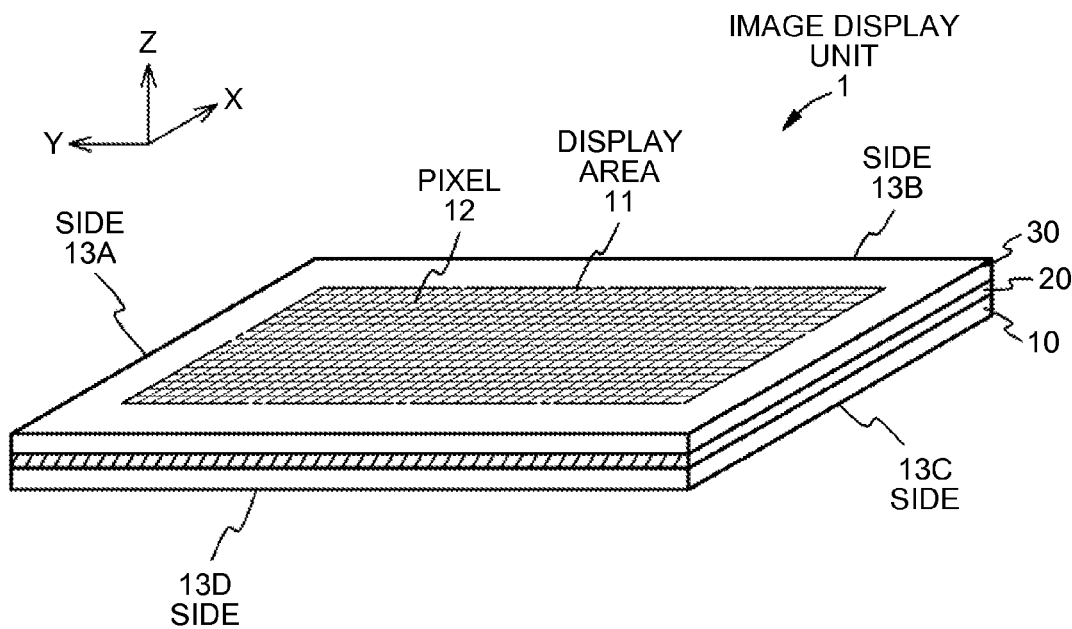
FIG. 2A is a schematic perspective view for explaining a configuration of a reflective image display unit.

The present disclosure will now be described according to the following orders and with reference to the accompanying drawings. The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

1. General Configuration of Display Device
2. First Embodiment
3. Second Embodiment
4. Third Embodiment
5. Fourth Embodiment (and others)

[General Configuration of Display Device]

An anisotropic scattering member according to the present disclosure transmits light entered from a predetermined direction and scatters light entered from another predetermined direction. In a display device according to the present disclosure, the anisotropic scattering member may be disposed so that the scattered light is emitted when a light reflected in the image display unit passes through the anisotropic scattering member. Alternatively, the anisotropic scattering member may be disposed so that the scattered light is emitted when an incident light from outside passes through the anisotropic scattering member.

The anisotropic scattering member can be formed with using a composition or the like containing a photoreactive compound. For example, the anisotropic scattering member can be obtained in such a manner that a base material made of a composition whose refractive index changes to a certain extent before and after photopolymerization is irradiated with a light such as UV light from a predetermined direction. As ingredients or components of the composition, appropriate materials whose refractive index changes to a certain extent between a photoreacted portion and the other portion can be selected from known photoreactive materials such as polymer or the like having a radical polymerizable functional group or a cation polymerizable functional group.

The anisotropic scattering member also can be obtained in such a manner that a base material made of a composition for which a photoreactive compound and a non-photoreactive high molecular compound are mixed is irradiated with a light such as UV light from a predetermined direction. The non-photoreactive high molecular compound can be selected as appropriate from known materials such as acrylic resin, styrene resin and the like, for example.

The base material made of aforementioned compositions can be obtained in such a manner that appropriate composition is applied on a polymer film base body by a known application method.

In a surface of the anisotropic scattering member made from the aforementioned composition, both a low refractive index area and a high refractive index area exist. A boundary between the low refractive index and the high refractive index forms a predetermined angle relative to a thickness direction of the anisotropic scattering member. Depending on the situation, it is possible to arrange the angle so that the angle continuously changes in the in-plane or surface direction.

Qualitatively, when the base material made of the composition is irradiated with light, closer the irradiation side, faster the photoreaction of the composition. Therefore, a surface irradiated with light is likely to be a surface where an extent of refractive index difference at a boundary or vicinity thereof between the low refractive index area and the high refractive index area is relatively large. In contrast, an opposite surface is likely to be a surface where an extent of refractive index difference at a boundary or vicinity thereof between the low refractive index area and the high refractive index area is relatively small.

The refractive index difference between the low refractive index area and the high refractive index area is preferably and usually not less than 0.01, more preferably not less than 0.05, and still more preferably not less than 0.10, in a vicinity of a surface where the refractive index difference at a boundary or vicinity thereof between the low refractive index area and the high refractive index area is relatively large.

Depending on the materials and/or manufacturing method, the anisotropic scattering member can be formed so that the photoreacted portion and the other portion take various shapes. For example, the photoreacted portion and the other portion may take a louver-like shape or configuration. The photoreacted portion and the other portion may be formed as one or more column-like portions and a surrounding portion thereof.

Examples of a reflective image display unit constituting the display device according to the present disclosure include, but are not limited to, a reflective liquid crystal display panel, etc. The image display unit may perform monochrome display or color display. The reflective liquid crystal display panel includes reflecting electrodes that reflect external light, for example. The reflective liquid crystal display panel displays an image by controlling the reflection ratio of external light with a liquid crystal material layer.

The reflective liquid crystal display panel is formed of a front substrate provided with transparent common electrodes, a back substrate provided with pixel electrodes, and the liquid crystal material layer arranged between the front substrate and the back substrate, for example. The pixel electrodes themselves may be provided as reflecting electrodes and reflect light. Alternatively, a reflective film may reflect light in a combination of transparent pixel electrodes and the reflective film. An operating mode of the liquid crystal display panel is not particularly restricted as long as the operating mode does not interfere with a reflective display operation. The liquid crystal display panel may be driven in what is called a vertical alignment (VA) mode or an electrically controlled birefringence (ECB) mode, for example.

In the display device according to the present disclosure having the various types of preferable configurations described above, the image display unit may be formed of the reflective liquid crystal display panel. The reflective liquid crystal display panel includes the front substrate, the back substrate, and the liquid crystal material layer arranged between the front substrate and the back substrate. The anisotropic scattering member may be disposed on the front substrate side.

In the display device according to the present disclosure having the various types of preferable configurations described above, the anisotropic scattering member may be formed by laminating a plurality of scattering members having different scattering characteristics.

Transflective image display units having both reflective and transmissive characteristics are widely known, including a transflective liquid crystal display panel provided with both a reflective display area and a transmissive display area in a pixel, for example. In some cases, the image display unit may be such a transflective image display unit. In other words, the "reflective image display unit" includes a "transflective image display unit".

The shape of the image display unit is not particularly restricted and may be a horizontally long rectangle or a vertically long rectangle. Assuming that (M,N) denotes the number of pixels M×N in the image display unit, a horizontally long rectangular image display unit may have some types of image display resolution, such as (640,480), (800,600), and (1024,768), as the value of (M,N), for example. By contrast, a vertically long rectangular image display unit may have resolution obtained by switching the values described above, for example. The resolution is not limited to these values.

A drive circuit that drives the image display unit may be formed of various circuits. These circuits may be formed using well-known circuit elements, for example.

Various types of conditions described in the present specification are satisfied in a substantial manner besides in a strict manner. Various fluctuations in design and manufacture are allowable.

First Embodiment

A first embodiment relates to a display device according to the present disclosure. FIG. 1 is a schematic perspective view of the display device according to the first embodiment.

As illustrated in FIG. 1, a display device 100 includes a reflective image display unit 1 having a display area 11 in which pixels 12 are arrayed. The image display unit 1 is formed of a reflective liquid crystal display panel and is incorporated in a housing 40. The image display unit 1 is driven by a drive circuit, which is not illustrated, for example. In FIG. 1, a part of the housing 40 is cut out. External light, such as sunlight, enters the display area 11. For convenience of explanation, an assumption is made that the display area 11 is parallel to the X-Y plane and that the side from which an image is observed is positioned in the +Z-direction.

Figure 2B:
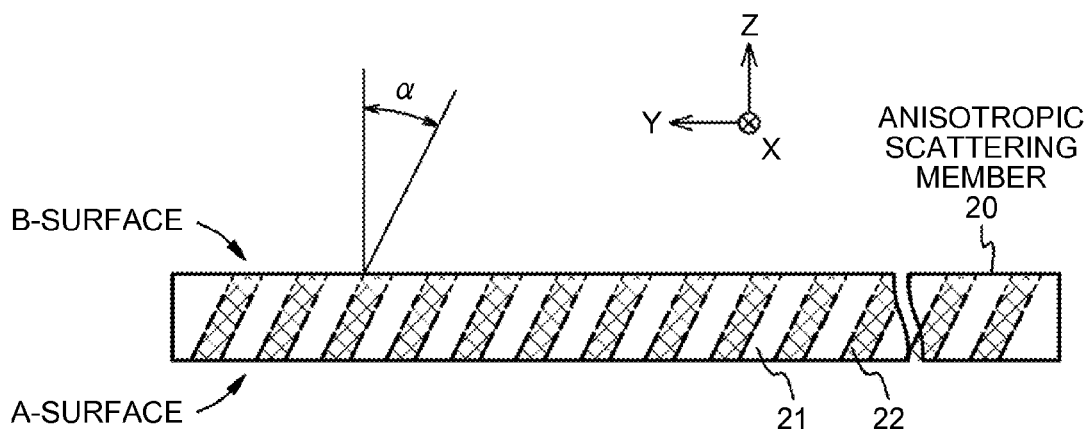
FIG. 2B is a schematic sectional view for explaining a structure of an anisotropic scattering member according to the first embodiment.
Figure 2C:
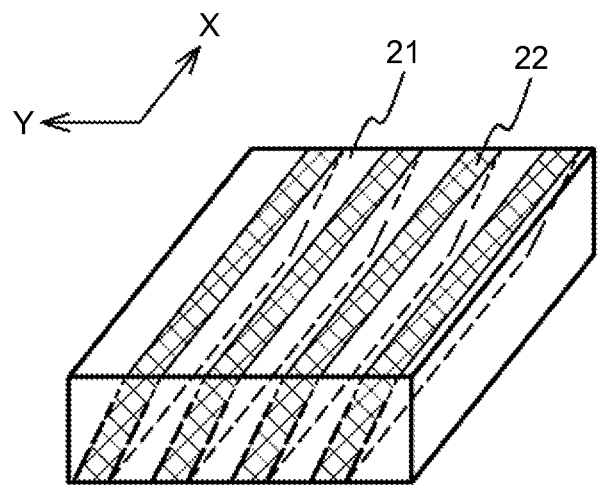
FIG. 2C is a schematic perspective view for explaining arrangement of a low refractive index area and a high refractive index area in the anisotropic scattering member.
Figure 2D:
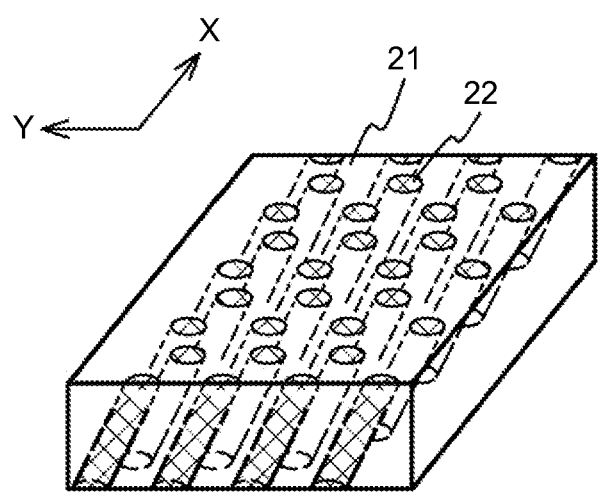
FIG. 2D is a schematic perspective view for explaining another arrangement of the low refractive index area and the high refractive index area in the anisotropic scattering member.

FIG. 2A is a schematic perspective view for explaining the configuration of the reflective image display unit. FIG. 2B is a schematic sectional view for explaining a structure of an anisotropic scattering member according to the first embodiment. FIG. 2C and FIG. 2D are schematic perspective views for explaining arrangement of a low refractive index area and a high refractive index area in the anisotropic scattering member.

The image display unit 1 illustrated in FIG. 2A is a reflective image display unit including a sheet-like anisotropic scattering member 20. More specifically, the image display unit 1 is formed of a reflective liquid crystal display panel including a front substrate, a back substrate, and a liquid crystal material layer arranged between the front substrate and the back substrate. The image display unit 1 is formed by laminating a laminated body 10, the anisotropic scattering member 20, and a laminated body 30. The laminated body 10 illustrated in FIG. 2A serves as a part of the liquid crystal display panel. The laminated body 10 is formed by laminating a front substrate 18, a back substrate 14, and a liquid crystal material layer 17 arranged between the front substrate 18 and the back substrate 14 illustrated in FIG. 6A, which will be described later. The anisotropic scattering member 20 serves as a part of the liquid crystal display panel and is disposed on the front substrate 18 side. The laminated body 30 illustrated in FIG. 2A is formed by laminating a quarter-wave plate 31, a half-wave plate 32, and a polarizing plate 33 illustrated in FIG. 6A.

As illustrated in FIG. 2A, the image display unit 1 has a rectangular shape. The sides of the image display unit 1 are denoted by reference numerals of 13A, 13B, 13C and 13D. The side 13C is a side on the front side, and the side 13A is a side opposite to the side 13C. The sides 13A and 13C have a length of approximately 12 cm, whereas the sides 13B and 13D have a length of approximately 16 cm, for example. These lengths are given as examples only.

The anisotropic scattering member 20 is a sheet (a film) having a thickness of approximately 0.02 to 0.5 mm, for example. As illustrated in FIG. 2B, the surface of the anisotropic scattering member 20 is formed as a region in which a low refractive index area 21 and a high refractive index area 22 are mixed in a micron order. For convenience of illustration, FIG. 2A to FIG. 2D and other figures do not illustrate a transparent film serving as a base sheet of the anisotropic scattering member 20, for example.

The anisotropic scattering member 20, which will be described later in detail with reference to FIG. 6A, is disposed so that an external light enters from a first surface and the incident light scatters from a second surface. The first surface is a side where an extent of change of the refractive index is relatively large near a boundary between the low refractive index area 21 and the high refractive index area 22. The second surface is a side where an extent of change of the refractive index is relatively small near a boundary between the low refractive index area 21 and the high refractive index area 22. In the first embodiment, the anisotropic scattering member 20 is disposed so that the external light reflected inside of the image display unit 1 scatters when passing through the anisotropic scattering member 20.

The anisotropic scattering member 20 is formed of a composition or the like containing a photoreactive compound, for example. As illustrated in FIG. 2C, the anisotropic scattering member 20 may have a structure in which the low refractive index area 21 and the high refractive index area 22 are formed in a louver-like manner, for example. Alternatively, as illustrated in FIG. 2D, the anisotropic scattering member 20 may have a structure in which the high refractive index area 22 and the low refractive index area 21 form column-shaped areas and a peripheral area surrounding the column-shaped areas, respectively. In an example illustrated in FIG. 2D, a composition part which has been photoreacted transforms into the high refractive index area in a column-shaped manner.

Although the widths of the low refractive index areas 21 in the thickness direction and the widths of the high refractive index areas 22 in the thickness direction are depicted as constant in FIG. 2C, this is given as an example only. Similarly, although the shapes of the column-shaped areas are depicted as the same in FIG. 2D, this is given as an example only.

In the anisotropic scattering member 20, the low refractive index area 21 and the high refractive index area 22 are formed in an oblique direction such that the boundary between the low refractive index area 21 and the high refractive index area 22 forms an angle α with respect to the thickness direction (Z-direction) of the anisotropic scattering member 20 as illustrated in FIG. 2B to FIG. 2D. The angle α is set to a preferable value as appropriate depending on specifications of the anisotropic scattering member 20, for example. In some cases, the angle α may be set to 0 degree.

Figure 4A:
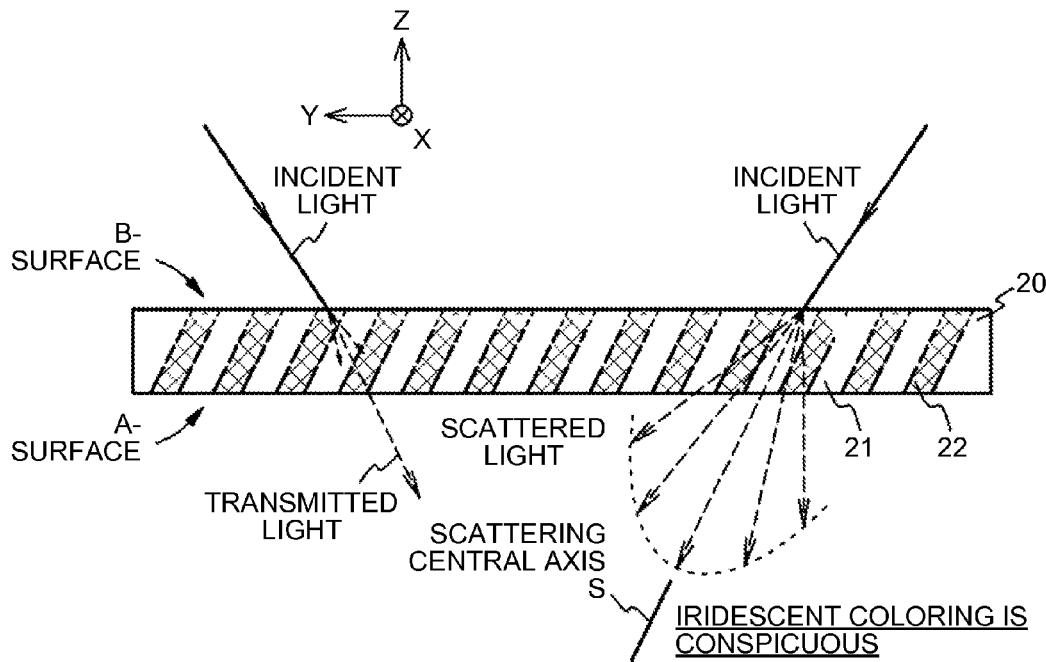
FIG. 4A is a schematic view for explaining a relation between incident light and scattered light in the anisotropic scattering member.
Figure 4B:
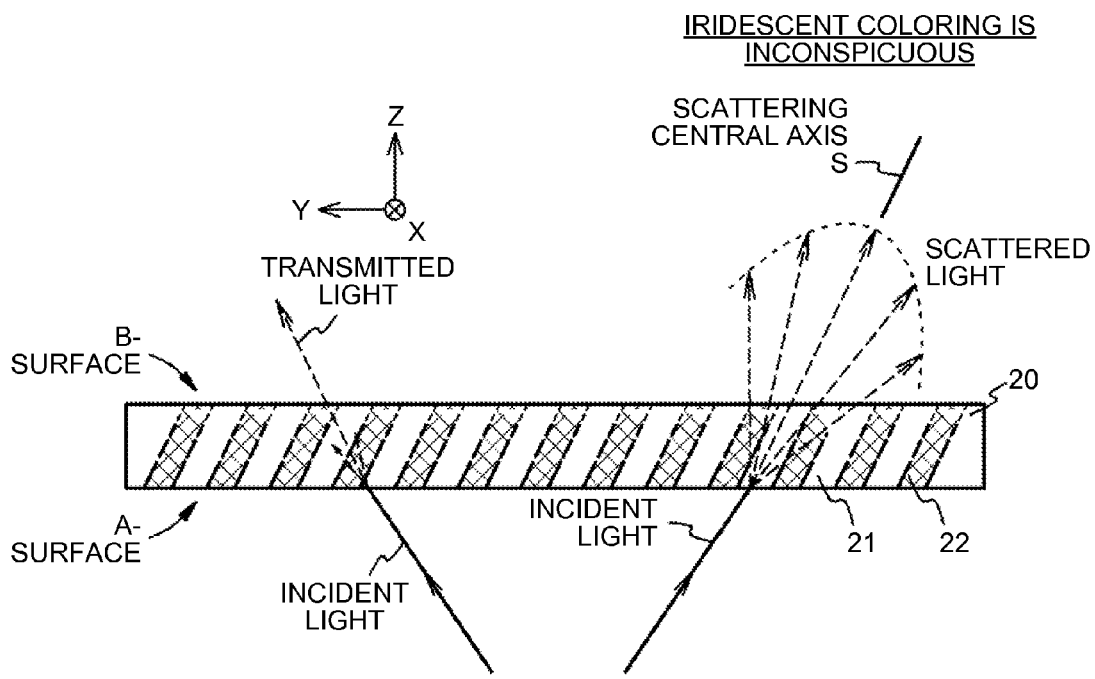
FIG. 4B is another schematic view for explaining the relation between incident light and scattered light in the anisotropic scattering member.

As illustrated in FIG. 4A and FIG. 4B, which will be described later, a scattering central axis S of the anisotropic scattering member 20 is inclined with respect to the normal direction (Z-axis direction) of the observation surface of the display device 100. The scattering central axis S is an axis around which an anisotropic scattering characteristics of the incident light becomes substantially symmetrical. In other words, the scattering central axis S is an axis extending in an incident direction of the most scattering light. The scattering central axis S is inclined basically in the same direction as the extending direction of the low refractive index area 21 and the high refractive index area 22. The inclination angle of the scattering central axis S may be the same as or different from the inclination angle of the extending direction of the low refractive index area 21 and the high refractive index area 22. In the case illustrated in FIG. 2C, the azimuth in which the scattering central axis S is projected on the X-Y plane corresponds to a direction perpendicular to the direction in which the louver-like areas extend. In the case illustrated in FIG. 2D, the azimuth corresponds to a direction in which a shadow obtained by projecting the column-shaped area on the X-Y plane extends.

For convenience of explanation, an assumption is made that the low refractive index area 21 and the high refractive index area 22 are each formed in a louver-like manner and that the direction in which the louver-like areas extend is parallel to the X-direction as illustrated in FIG. 2C. While the high refractive index area 22 is described as an area in which a base material causes photoreaction, this is given as an example only. The area in which the base material causes photoreaction may be the low refractive index area 21.

Figure 3A:
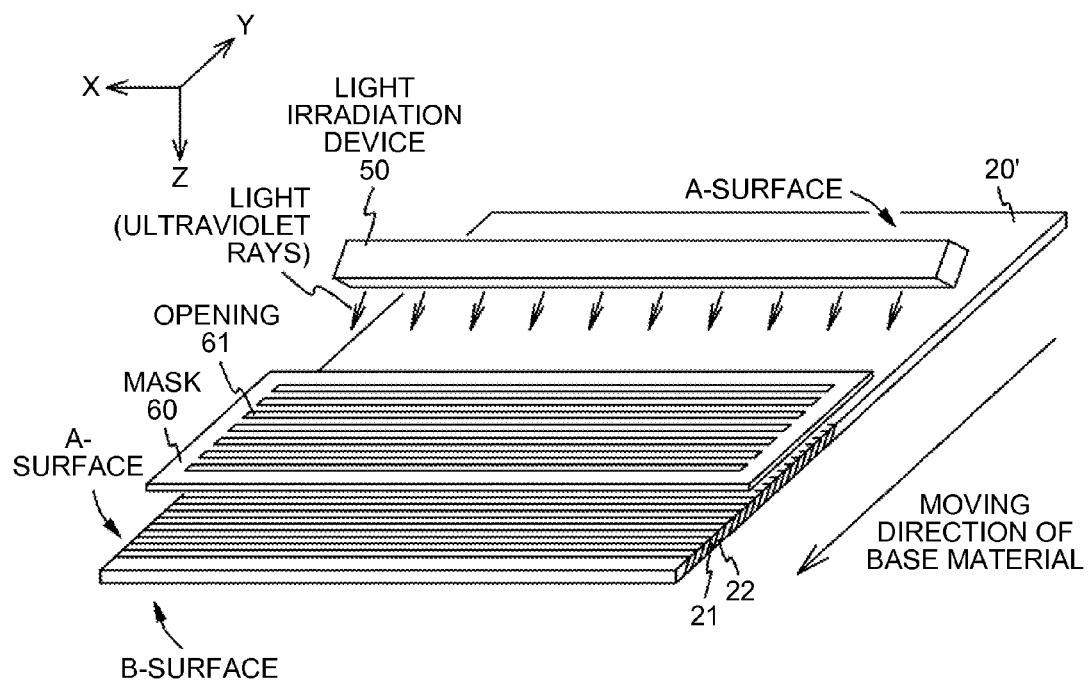
FIG. 3A is a schematic view for explaining a method for manufacturing the anisotropic scattering member according to the first embodiment.
Figure 3B:
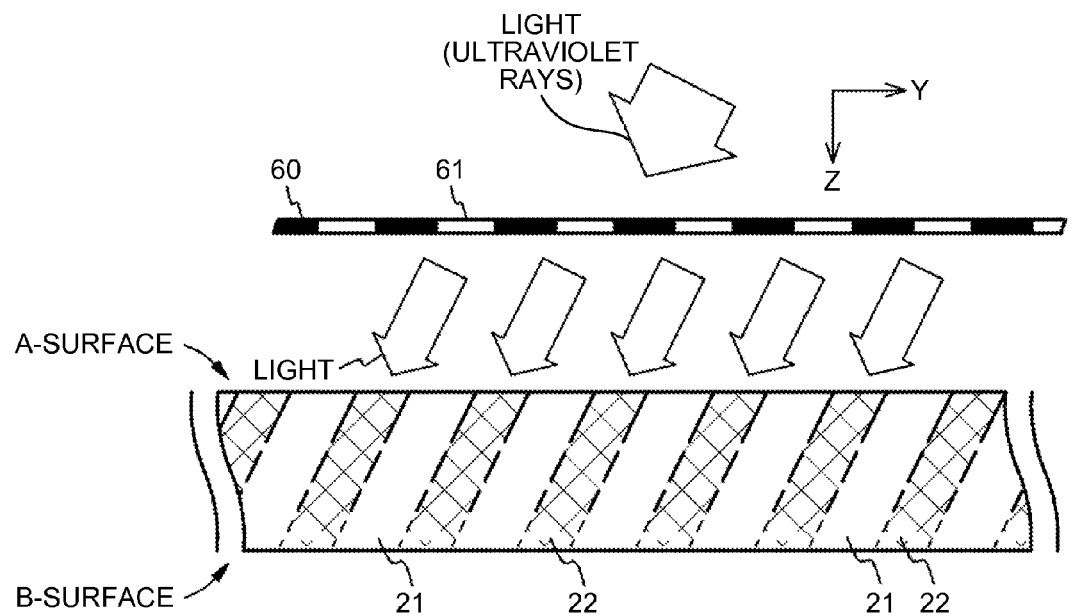
FIG. 3B is another schematic view for explaining the method for manufacturing the anisotropic scattering member according to the first embodiment.

The following describes a method for manufacturing the anisotropic scattering member 20 with reference to FIG. 3A and FIG. 3B. FIG. 3A and FIG. 3B are schematic views for explaining a method for manufacturing the anisotropic scattering member according to the first embodiment. As illustrated in FIG. 3A, the anisotropic scattering member 20 can be manufactured by: coating a base substance, such as a polyethylene terephthalate (PET) film, with a photoreactive composition to obtain a base material 20; and irradiating the base material 20' with light obliquely from a light irradiation device 50 through a mask 60 having openings 61, for example. In some cases, the base material 20' may be irradiated with light without using the mask 60. The surface of the base material 20' irradiated with the light output from the light irradiation device 50 is referred to as A-surface, whereas the side opposite thereto is referred to as a B-surface.

Influences of diffraction of light, light absorption caused by the composition, and other factors qualitatively facilitate photoreaction in the composition at a portion closer to the light irradiation side. As a result, the A-surface irradiated with the light is a surface in which a change in the refractive index occurring near the boundary between the low refractive index area 21 and the high refractive index area 22 is relatively large as illustrated in FIG. 3B. By contrast, the B-surface opposite thereto is a surface in which a change in the refractive index occurring near the boundary between the low refractive index area 21 and the high refractive index area 22 is relatively small.

By adjusting the angle of the irradiation light, it is possible to set the angle α of the boundary between the low refractive index area 21 and the high refractive index area 22 with respect to the thickness direction (Z-direction) of the anisotropic scattering member 20 to various angles in the anisotropic scattering member 20. By adjusting the interval between the irradiation positions of the irradiation pattern, it is possible to adjust the interval between the boundaries of the low refractive index area 21 and the high refractive index area 22 and the interval between the high refractive index area 22 and the high refractive index area 22, for example.

The following describes the difference between the case where external light enters the A-surface of the anisotropic scattering member 20 and the case where external light enters the B-surface with reference to FIG. 4A and FIG. 4B. FIG. 4A and FIG. 4B are schematic views for explaining a relation between incident light and scattered light in the anisotropic scattering member. FIG. 4A and FIG. 4B are different from each other in the light incident directions.

As illustrated in FIG. 4A and FIG. 4B, if light enters the anisotropic scattering member 20 in a direction substantially along the direction in which the boundary between the low refractive index area 21 and the high refractive index area 22 extends, the light is scattered and then exits from the anisotropic scattering member 20. By contrast, if light enters the anisotropic scattering member 20 in a direction substantially perpendicular to the direction in which the boundary between the low refractive index area 21 and the high refractive index area 22 extends, the light passes through the anisotropic scattering member 20 without any change.

If light enters the B-surface and exits as scattered light from the A-surface as illustrated in FIG. 4A, the scattered light exits from the surface where an extent of refractive index difference at a boundary or vicinity thereof between the low refractive index area 21 and the high refractive index area 22 is relatively large. Therefore, optical interference due to a microstructure makes the iridescence (rainbow-colored glare) noticeable.

In contrast, if light enters the A-surface and exits as scattered light from the B-surface as illustrated in FIG. 4B, the scattered light exits from the surface where an extent of refractive index difference at a boundary or vicinity thereof between the low refractive index area 21 and the high refractive index area 22 is relatively small. Therefore, it is possible to reduce the iridescence (rainbow-colored glare) caused by optical interference due to a microstructure.

Figure 5:
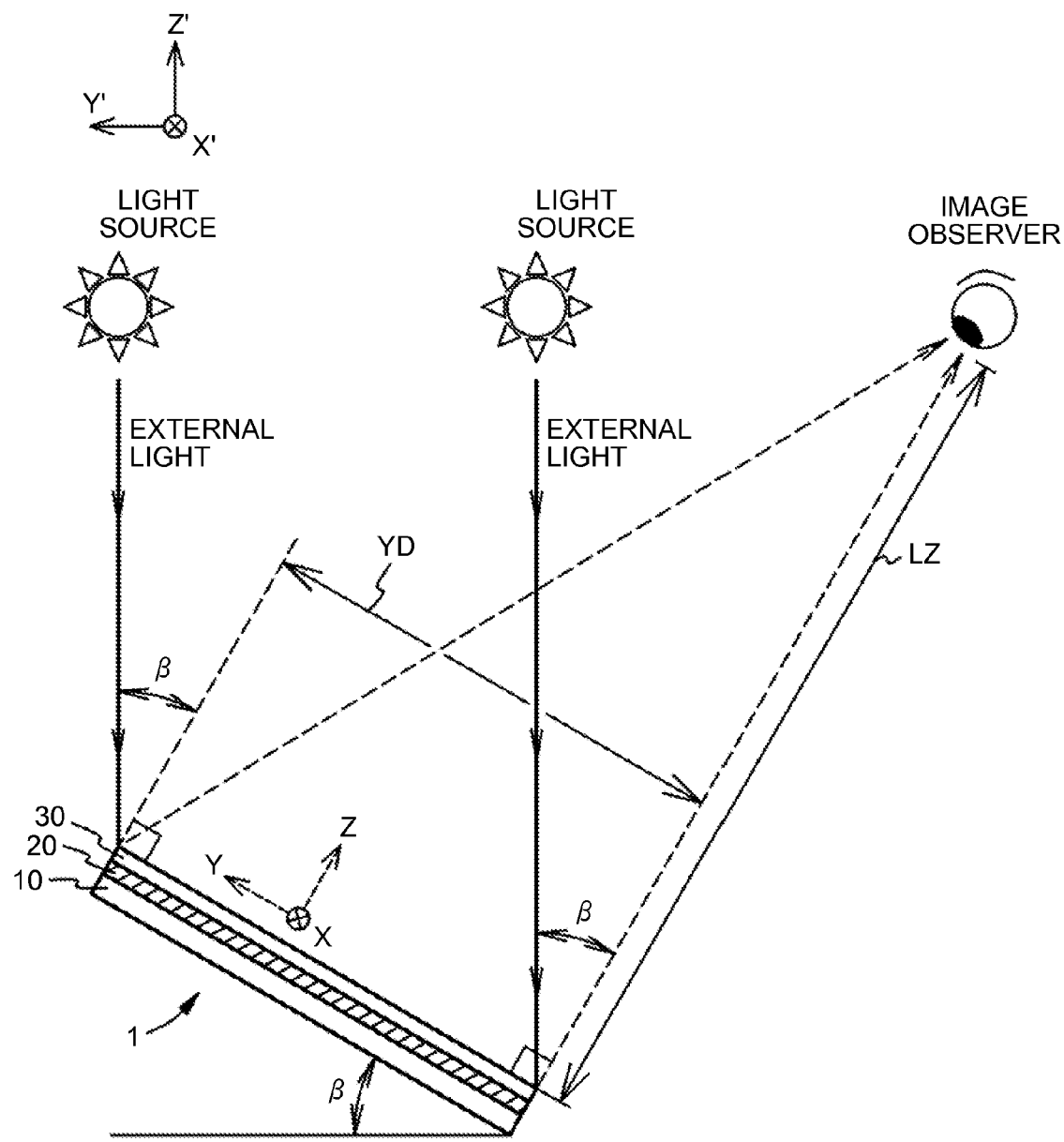
FIG. 5 is a schematic view for explaining a positional relation between the display device and an image observer when substantially parallel external light enters.

FIG. 5 is a schematic view for explaining a positional relation between the display device and an image observer when substantially parallel external light enters. In FIG. 5, an image observer observes an image at a position distant from the display area 11 by a distance LZ in the state where the incident direction of the external light and the normal direction of the image display unit 1 form an angle β. YD denotes the length of the surface inclined with respect to the incident direction of the external light by the angle β in the image display unit 1.

The following describes behavior of light in the image display unit 1 when display is being performed in the positional relation illustrated in FIG. 5 with reference to FIG. 6A and FIG. 6B. FIG. 6A is a schematic sectional view of the reflective image display unit according to the first embodiment. FIG. 6B is a schematic sectional view of a reflective image display unit according to a comparative embodiment.

In the image display unit 1 illustrated in FIG. 6A, a planarizing film 15 made of a polymeric material, such as acrylic resin, is formed on the back substrate 14 made of a glass material, for example. Reflecting electrodes (pixel electrodes) 16 made of a metallic material, such as aluminum, are formed on the planarizing film 15. The reflecting electrodes 16 each have a mirror-like surface and are provided to respective pixels 12. To control electrical connection between signal lines and the reflecting electrodes 16, elements including thin film transistors (TFT) are coupled to the respective pixels 12. FIG. 3A does not illustrate various wirings including the TFTs and the signal lines.

In the image display unit 1 illustrated in FIG. 6A, the front substrate 18 made of a glass material is provided with common electrodes, which are not illustrated, made of a transparent conductive material, such as indium tin oxide (ITO), for example. To perform color display, the pixel 12 is formed of a group of sub-pixels, and color filters and other components are provided to the respective sub-pixels. For convenience of illustration, FIG. 6A does not illustrate the common electrodes, for example.

The liquid crystal material layer 17 is arranged between the front substrate 18 and the back substrate 14. In the liquid crystal material layer 17, liquid crystal molecules 17A are oriented in a predetermined direction. The liquid crystal material layer 17 has a thickness large enough to act as a half-wave plate when light is reciprocated by a spacer, which is not illustrated, in predetermined conditions, for example.

The anisotropic scattering member 20 is disposed on the side opposite to the liquid crystal material layer 17 side of the front substrate 18. The quarter-wave plate 31, the half-wave plate 32, and the polarizing plate 33 are arranged above the anisotropic scattering member 20.

An incident light entered from outside is formed into a linear polarized light with a predetermined direction through the polarizing plate 33. After that, the linear polarized light is formed into a circular polarized light through the half-wave plate 32 and the quarter-wave plate 31. A combination of the half-wave plate 32 and the quarter-wave plate 31 functions as a broadband quarter-wave plate. The circular polarized light enters the scattering member 20 from a direction orthogonal or almost orthogonal to a direction in which a boundary between the low refractive index area 21 and the high refractive index area 22 extends. Therefore, the circular polarized light passes through the scattering member 20 without scattering, then passes through the liquid crystal material layer 17, and reaches the reflecting electrode 16. The light is reflected on the reflecting electrode 16 and passes through the liquid crystal material layer 17. Thus, the light enters from A-surface and exits from B-surface of the anisotropic scattering member 20. Since the light enters the scattering member 20 from a direction along or substantially along a direction in which a boundary between the low refractive index area 21 and the high refractive index area 22 extends, the light exits as scattered light from the scattering member 20. However, since the scattered light exits from a surface where an extent of refractive index difference at a boundary or vicinity thereof between the low refractive index area 21 and the high refractive index area 22 is relatively small, the iridescence caused by optical interference due to a microstructure is reduced. Then, the scattered light reaches the polarizing plate 33 through the quarter-wave plate 31 and the half-wave plate 32. From the polarizing plate 33, the light emits toward outside. It is possible to control an amount of the light which is reflected by the reflecting electrode 16 and passing through the polarizing plate 33, by controlling an electric voltage applied to the reflecting electrode 16 or the like and thus controlling the alignment state of the liquid crystal molecular 17A in the liquid crystal material layer 17.

By contrast, the following describes behavior of light in the case where the A-surface and the B-surface are upside down in the anisotropic scattering member 20. Now, with reference to FIG. 6B, an explanation will be made on behavior of light in an image display unit 1' according to a comparative embodiment in which the A-surface and the B-surface are upside down in the anisotropic scattering member 20.

In this case, behavior performed until external light reflected by the reflecting electrode 16 passes through the liquid crystal material layer 17 is the same as the behavior described above. The reflected light passes through the liquid crystal material layer 17. The reflected light then enters the B-surface of the anisotropic scattering member 20 and exits from the A-surface. Because the light enters from a direction along or substantially along a direction in which the boundary between the low refractive index area 21 and the high refractive index area 22 extends, the light is scattered. The scattered light exits from the surface where an extent of refractive index difference at a boundary or vicinity thereof between the low refractive index area 21 and the high refractive index area 22 is relatively large. Therefore, optical interference due to a microstructure makes the iridescence (ex. rainbow-colored glare) noticeable.

Thus, in the first embodiment, the anisotropic scattering member is disposed so that a light enters from A-surface and exits as scattered light from B-surface, when an extent of refractive index difference at a boundary or vicinity thereof between the low refractive index area and the high refractive index area is relatively large in A-surface and relatively small in B-surface. More specifically, the anisotropic scattering member is disposed so that a light is scattered when the light reflected in the image display unit passes through the anisotropic scattering member toward outside. Since the light is scattered when exiting from the surface where an extent of refractive index difference at a boundary or vicinity thereof between the low refractive index area and the high refractive index area is relatively small, the iridescence (ex. rainbow-colored glare) caused by optical interference due to a microstructure can be reduced.

Assuming that 2φ denotes a scattering angular range, θ denotes a main incident angle of set light, and T(a) denotes transmittance at a position on an extension line in the incident direction of the light at an incident angle a, the main incident angle θ satisfies θ<0, and the anisotropic scattering member 20 satisfies $0.7 < T(\theta-\phi)/T(\theta) \le 1$.

Figure 7:
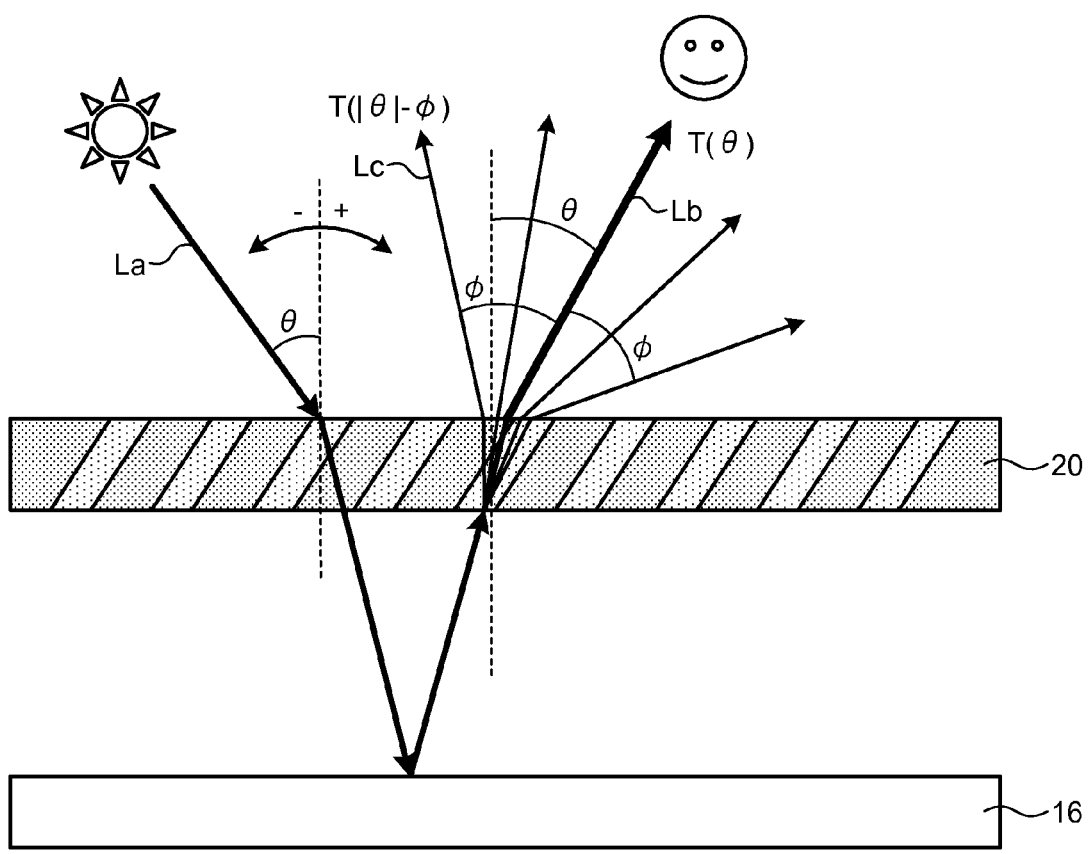
FIG. 7 is a schematic view for explaining a relation between incident light and scattered light in the anisotropic scattering member.
Figure 8:
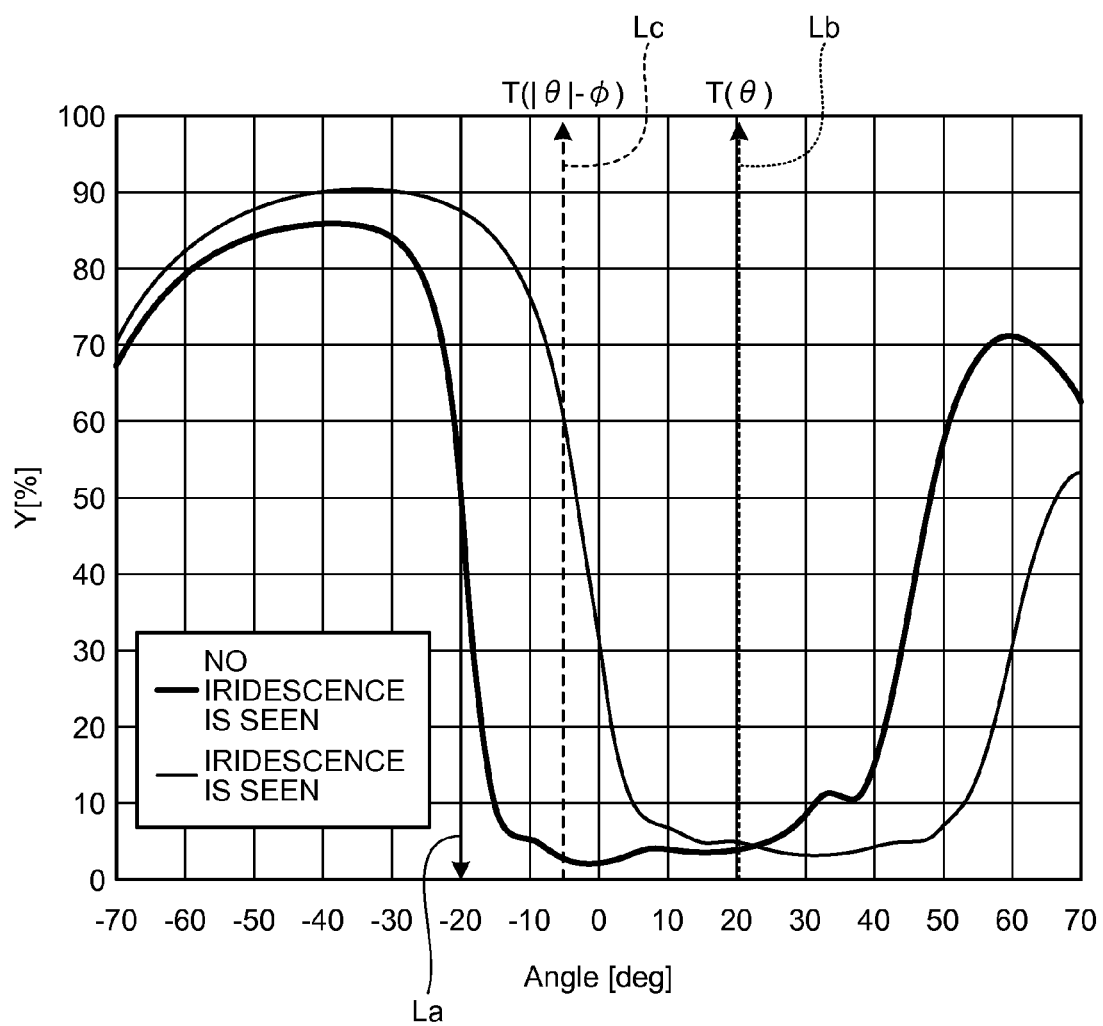
FIG. 8 is a schematic view illustrating results obtained by measuring performance of the anisotropic scattering member.
Figure 9A:
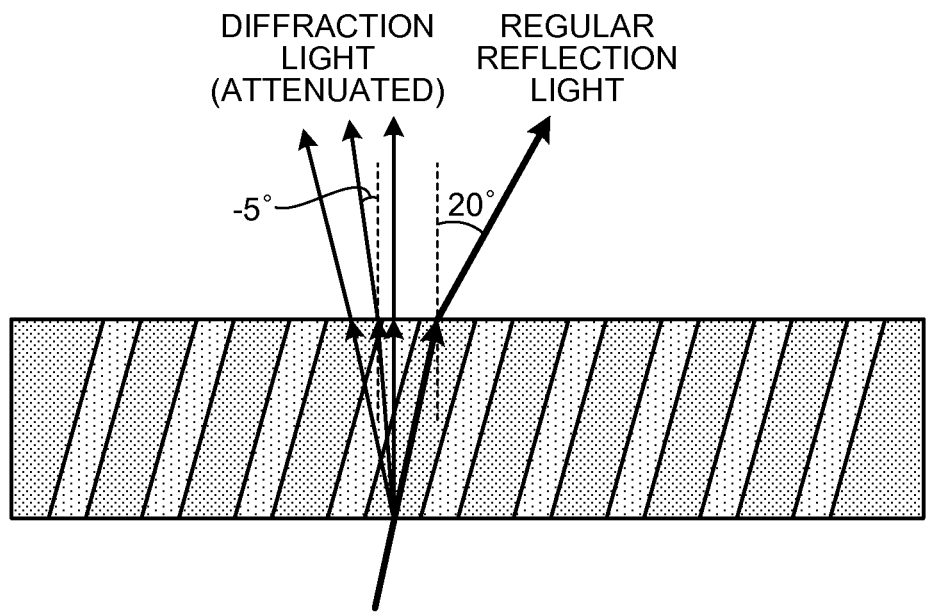
FIG. 9A is a schematic view for explaining a relation between incident light and scattered light in the anisotropic scattering member.
Figure 9B:
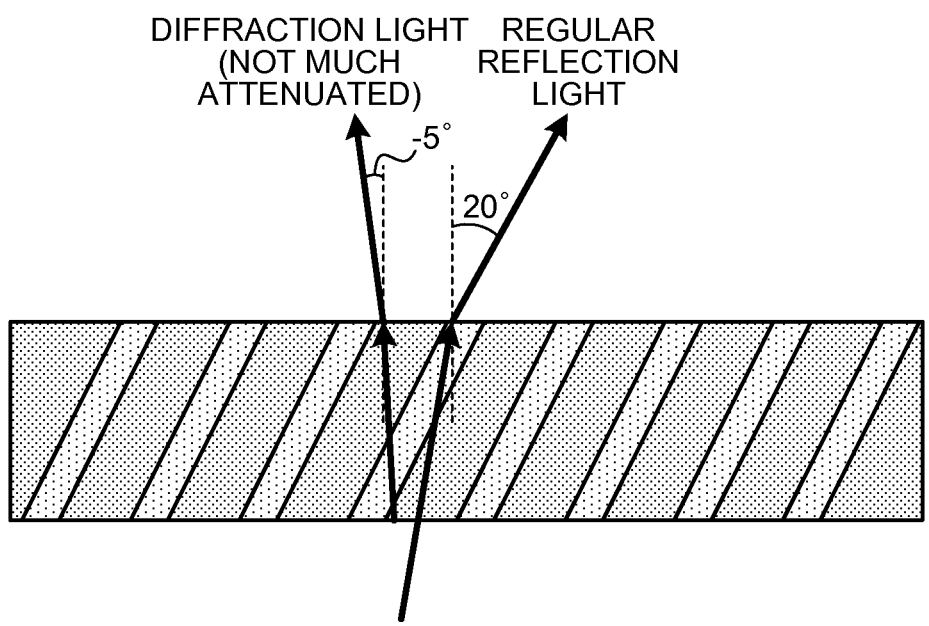
FIG. 9B is another schematic view for explaining the relation between incident light and scattered light in the anisotropic scattering member.
Figure 10A:
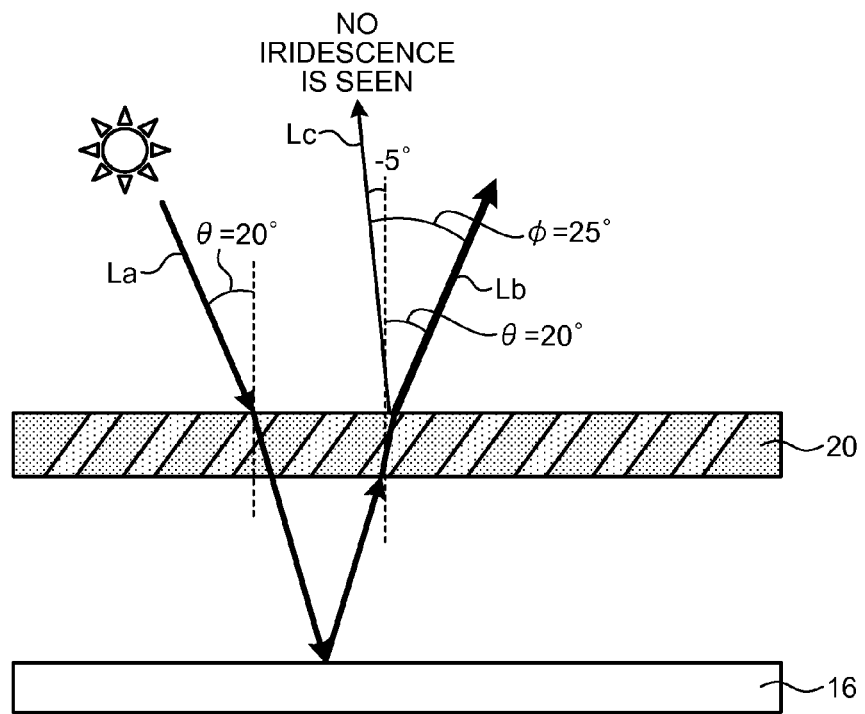
FIG. 10A is a schematic view for explaining a relation between incident light and scattered light in the anisotropic scattering member.
Figure 10B:
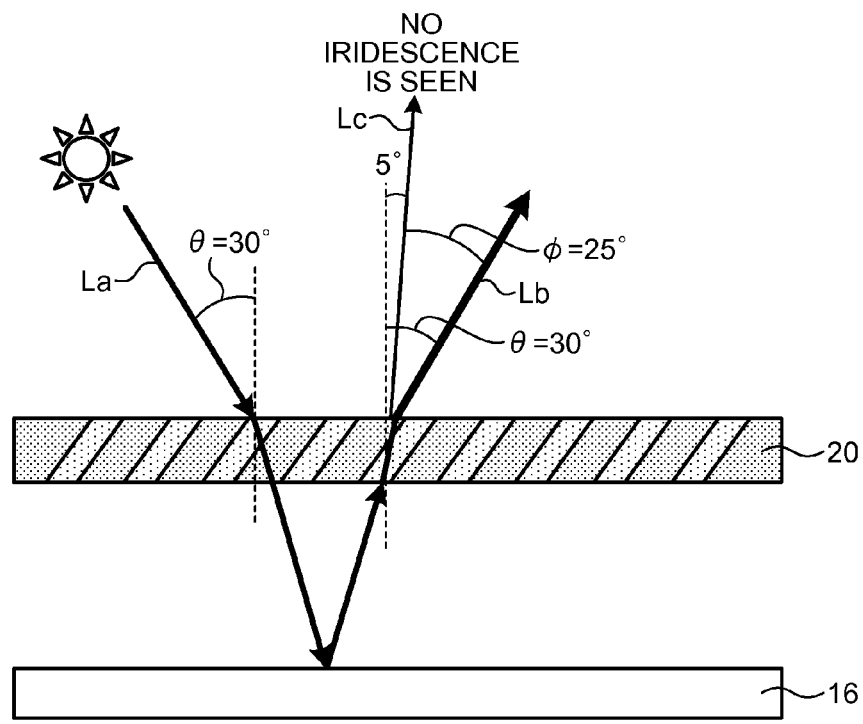
FIG. 10B is another schematic view for explaining the relation between incident light and scattered light in the anisotropic scattering member.
Figure 11:
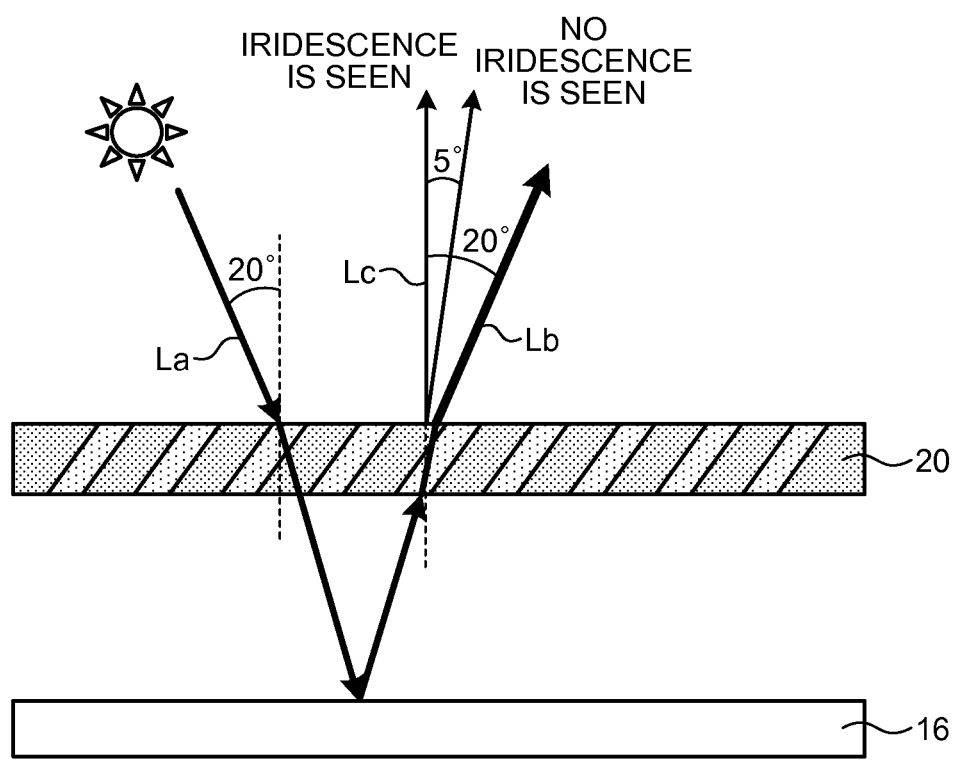
FIG. 11 is still another schematic view for explaining the relation between incident light and scattered light in the anisotropic scattering member.

The relation described above will be explained with reference to FIG. 7 to FIG. 11. FIG. 7 is a schematic view for explaining a relation between incident light and scattered light in the anisotropic scattering member. FIG. 8 is a schematic view illustrating results obtained by measuring performance of the anisotropic scattering member. FIG. 9A is a schematic view for explaining a relation between incident light and scattered light in the anisotropic scattering member. FIG. 9B is another schematic view for explaining the relation between incident light and scattered light in the anisotropic scattering member. FIG. 10A is a schematic view for explaining a relation between incident light and scattered light in the anisotropic scattering member. FIG. 10B is another schematic view for explaining the relation between incident light and scattered light in the anisotropic scattering member. FIG. 11 is still another schematic view for explaining the relation between incident light and scattered light in the anisotropic scattering member.

The following describes the main incident angle of set light $\theta$ and the scattering angular range $2\phi$ according to the present embodiment. The main incident angle $\theta$ is an angle at which external light La is set to be incident in designing. The main incident angle $\theta$ is 0 when the external light La enters perpendicularly (vertically) to the surface of the anisotropic scattering member 20. A direction in which the main incident angle $\theta$ rotates closer to the image observer from the vertical direction corresponds to a positive direction, whereas a direction in which the main incident angle $\theta$ rotates away from the image observer from the vertical direction corresponds to a negative direction. In FIG. 7, the main incident angle $\theta$ has a negative value.

The scattering angular range $2\phi$ is an angular range in which incident light can be scattered when the light enters the anisotropic scattering member 20 at various angles as the main incident angle $\theta$. Specifically, when light enters at a central angle of an angular unit that scatters light in the anisotropic scattering member 20, the anisotropic scattering member 20 outputs light spreading out at an angle $\phi$ in the positive direction with respect to the incident angle and at an angle $\phi$ in the negative direction. The scattering angular range $2\phi$ is also an angular range in which transmittance is reduced. The transmittance is measured for each angle at a position on an extension line in the incident direction of the light when the light enters. The angular range in which the transmittance is reduced corresponds to a range in which the incident light does not pass through the anisotropic scattering member 20 without any change. In other words, the angular range in which the transmittance is reduced is an angular range in which the incident light is scattered. Thus, the scattering angular range $2\phi$ is an angular range in which the incident light is scattered.

As illustrated in FIG. 7, the external light La incident at the main incident angle $\theta$ of a negative angle passes through the anisotropic scattering member 20 and is reflected by the reflecting electrode 16. The external light La then passes through the anisotropic scattering member 20 again and is output from the display device 1. Light Lb is output at an angle $-\theta$ (an angle $\theta$ in the positive direction) among the light that is reflected by the reflecting electrode 16, passes through the anisotropic scattering member 20 again, and is output from the display device 1. The light Lb is light not being scattered among the external light La. Light Lc is output at an angle $|\theta|-\phi$ among the light that is reflected by the reflecting electrode 16, passes through the anisotropic scattering member 20 again, and is output from the display device 1. The light Lc is light rotated closer to the external light La side than the light Lb by an angle $\phi$. The light Lc corresponds to an end on the external light La side in the case where the external light La incident at the main incident angle $\theta$ is scattered in the widest range by the anisotropic scattering member 20.

T(a) denotes the transmittance at a position on the extension line in the incident direction of the light obtained when the light enters the anisotropic scattering member 20 at the incident angle a. The distribution of the transmittance in the anisotropic scattering member 20 was measured. FIG. 8 illustrates the measurement result. In FIG. 8, the abscissa represents an angle (deg), and the ordinate represents transmittance (Y) (%) at a position rotated with respect to the incident angle by 180 degrees. FIG. 8 also illustrates a measurement result of transmittance distribution in another anisotropic scattering member having different characteristics as a comparative example. The transmittance distribution with which iridescence is seen in FIG. 8 is the distribution of the transmittance T(a) in the anisotropic scattering member 20 according to the present embodiment. The transmittance distribution with which no iridescence is seen in FIG. 8 is the distribution of the transmittance T(a) in the anisotropic scattering member according to the comparative example.

An examination is made of the case where the main incident angle $\theta$ is set to $-20°$ and the scattering angular range $2\theta$ is set to $50°$ in the transmittance distribution illustrated in FIG. 8. A part of the light incident as the external light La is reflected to be the light Lb of an angle of $20°$ ($-\theta$), whereas another part thereof is reflected to be the light Lc of an angle of $-5°$ ($|\theta|-\phi$). In this case, the anisotropic scattering member 20 according to the present embodiment satisfies $0.7<T(\theta-\phi)/T(\theta)\leq1$, thereby making the transmittance of the light Lc and the transmittance of the light La equivalent. $T(\theta-\phi)$ and $T(\theta)$ are portions having lower transmittance than other portions (portions with a larger angle), that is, a range in which the light is scattered. As a result, it is possible to scatter the light Lc output at the angle $|\theta|-\phi$ closer to the external light La side as illustrated in FIG. 9A. In other words, it is possible to scatter and attenuate diffracted light (diffraction light). This can suppress occurrence of iridescence at the angle $|\theta|-\phi$. Because the light can be scattered on the regular reflection light side with respect to the angle $|\theta|-\phi$, occurrence of iridescence can be suppressed also on the regular reflection light side. The light Lb is regular reflection light having relatively high intensity compared with other angles. The regular reflection light can also be scattered appropriately.

By contrast, the anisotropic scattering member according to the comparative example does not satisfy $0.7<T(\theta-\phi)/T(\theta)\leq1$, thereby making the transmittance of the light Lc higher than the transmittance of the light La. Because the light Lc output at the angle $|\theta|-\phi$ closer to the external light La side has high transmittance, the light Lc increases the ratio of passing through the anisotropic scattering member without any change as illustrated in FIG. 9B. In other words, diffracted light (diffraction light) is not much attenuated. This makes iridescence more likely to occur at the angle $|\theta|-\phi$.

Although the explanation has been made of the case where $\theta$ is set to $20°$ and $\phi$ is set to $25°$ ($2\phi=50°$) as illustrated in FIG. 10A in the embodiment, the values of the main incident angle $\theta$ and the scattering angular range $2\phi$ are not limited thereto. FIG. 10B illustrates the case where $\theta$ is set to $30°$ and $\phi$ is set to $25°$ ($2\phi=50°$), for example. Also in this case, when the anisotropic scattering member 20 satisfies $0.7<T(\theta-\phi)/T(\theta)\leq1$, occurrence of iridescence at the angle $|\theta|-\phi$ can be suppressed. By contrast, FIG. 11 illustrates the case where $\theta$ is set to $20°$ and $\phi$ is set to $20°$ ($2\phi=40°$). In this case, when the anisotropic scattering member 20 does not satisfy $0.7<T(\theta-\phi)/T(\theta)\leq1$, iridescence may possibly occur at a position of the angle $|\theta|-\phi$.

As described above, when satisfying $0.7<T(\theta-\phi)/T(\theta)\leq1$, the anisotropic scattering member can suppress occurrence of iridescence at a position rotated on the incident light side with respect to the regular reflection light having relatively high intensity by a predetermined angle, that is, at a position away from the regular reflection light by the angle $\phi$. This can reduce the risk that the image observer observes iridescence, thereby displaying a more preferable image to the image observer. Suppression of occurrence of iridescence at the angle $\theta-\phi$ can suppress occurrence of iridescence on the perpendicular line side of the display surface in which iridescence is made more conspicuous.

In the anisotropic scattering member 20, the relation between the transmittance $T(\theta-\phi)$ and the transmittance $T(\theta)$ needs to satisfy $0.7 < T(\theta-\phi)/T(\theta) \leq 1$. By making the transmittance $T(\theta-\phi)$ and the transmittance $T(\theta)$ closer to each other, that is, by making the transmittance at a position of regular reflection and the transmittance at a predetermined position on the perpendicular line side of the display surface closer to each other, occurrence of iridescence can be suppressed more appropriately.

By adjusting the widths of layers having different refractive indexes in the anisotropic scattering member 20, that is, by adjusting the pitch, it is possible to adjust the scattering angular range $2\phi$. Specifically, making the pitch smaller can enlarge $\phi$. By adjusting the inclination angle of the boundary between the high refractive index area and the low refractive index area with respect to the Z-axis (axis extending in a direction perpendicular to the surface of the anisotropic scattering member 20) in the anisotropic scattering member 20, it is possible to adjust the scattering angular range $2\phi$.

The main incident angle $\theta$ is preferably set to $-40°$ to $-20°$ inclusive in the anisotropic scattering member 20. Setting the main incident angle to $-40°$ to $-20°$ inclusive can make the angle of the regular reflection light Lb having high intensity $20°$ to $40°$ inclusive. This makes it possible to output regular reflection light in a range of $20°$ to $40°$ inclusive serving as a range in which the image observer normally observes an image. Setting the main incident angle to $-40°$ to $-20°$ inclusive can prevent the visual line direction of the image observer from significantly deviating from the normal line of the image display unit 1 when a light source is present just above the image display unit 1, for example. This makes it possible to output brighter light in the range in which the image observer normally observes an image.

The relation between the main incident angle $\theta$ and the scattering angular range $2\phi$ preferably satisfies $|\theta|-\phi<0$ in the anisotropic scattering member 20. When $|\theta|-\phi<0$ is satisfied, occurrence of iridescence can be suppressed at a position inclined to the direction in which the external light La enters with respect to the direction perpendicular to the surface of the anisotropic scattering member 20.

The scattering angular range $2\phi$ is preferably set equal to or larger than $50°$ in the anisotropic scattering member 20. More preferably, the scattering angular range $2\phi$ is set to $50°$ to $90°$ inclusive in the anisotropic scattering member 20. This makes it possible to scatter light at the angle $\theta$ and the angle $\theta-\phi$ appropriately.

Second Embodiment

A second embodiment also relates to a display device according to the present disclosure.

The second embodiment is different from the first embodiment in that an anisotropic scattering member is arranged so as to scatter external light incident from the outside while the light is passing through the anisotropic scattering member.

A display device 200 according to the second embodiment has the same configuration as that of the first embodiment except for the arrangement of the anisotropic scattering member. Because the image display unit 1 in FIG. 1 can be considered as an image display unit 2 and the display device 100 can be considered as the display device 200, a schematic perpendicular view of the display device 200 according to the second embodiment is not given. Because the image display unit 1 can be considered as the image display unit 2 by changing the arrangement of the anisotropic scattering member 20 in FIG. 2A as appropriate, a schematic perpendicular view for explaining the configuration of the image display unit 2 according to the second embodiment is not given.

Also in the second embodiment, an anisotropic scattering member 20 is arranged as follows: external light enters from the surface in which a change in the refractive index occurring near the boundary between a low refractive index area 21 and a high refractive index area 22 is relatively large; and the light exits as scattered light from the surface in which a change in the refractive index occurring near the boundary between the low refractive index area 21 and the high refractive index area 22 is relatively small. In the second embodiment, the anisotropic scattering member 20 is arranged so as to scatter external light incident from the outside while the light is passing through the anisotropic scattering member 20.

Figure 12A:
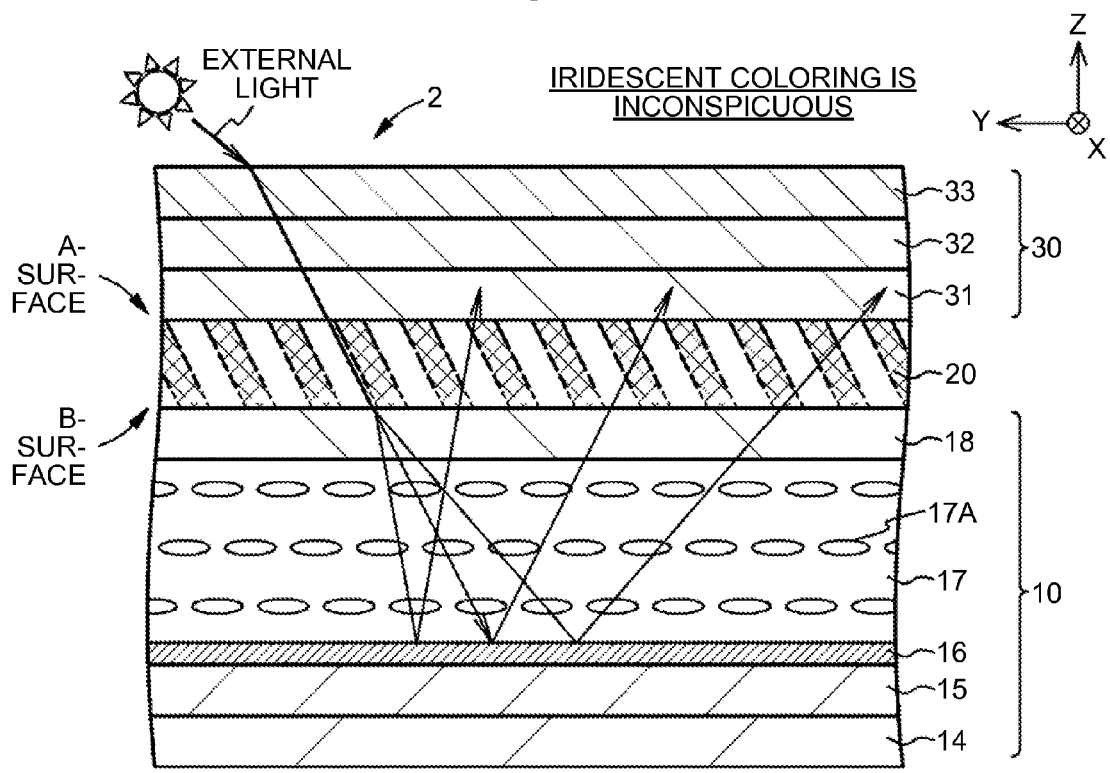
FIG. 12A is a schematic sectional view of a reflective image display unit according to a second embodiment.

Similarly to the description of the first embodiment, the following describes behavior of light in the image display unit 2 in the state where the incident direction of the external light and the normal direction of the image display unit 2 form an angle $\beta$ with reference to FIG. 12A.

As illustrated in FIG. 12A, the external light incident from the outside passes through a polarizing plate 33, a half-wave plate 32, and a quarter-wave plate 31, and enters the anisotropic scattering member 20. Unlike the first embodiment, the anisotropic scattering member 20 is arranged such that the direction in which the boundary between the low refractive index area 21 and the high refractive index area 22 extends is substantially along the incident light. The external light enters an A-surface and exits as scattered light from a B-surface. The light exits as scattered light from the surface in which a change in the refractive index occurring near the boundary between the low refractive index area 21 and the high refractive index area 22 is relatively small. This reduces iridescent coloring due to light interference caused by the microstructure. The light thus scattered passes through a liquid crystal material layer 17, is reflected by reflecting electrode 16, and passes through the liquid crystal material layer 17 again. The light is then incident on the B-surface of the anisotropic scattering member 20 and exits from the A-surface. Because the light enters in a direction substantially perpendicular to the direction in which the boundary between the low refractive index area 21 and the high refractive index area 22 extends, the light passes through the anisotropic scattering member 20 without any change. The light passes through the quarter-wave plate 31 and the half-wave plate 32 and reaches the polarizing plate 33. The light then exits to the outside.

Figure 12B:
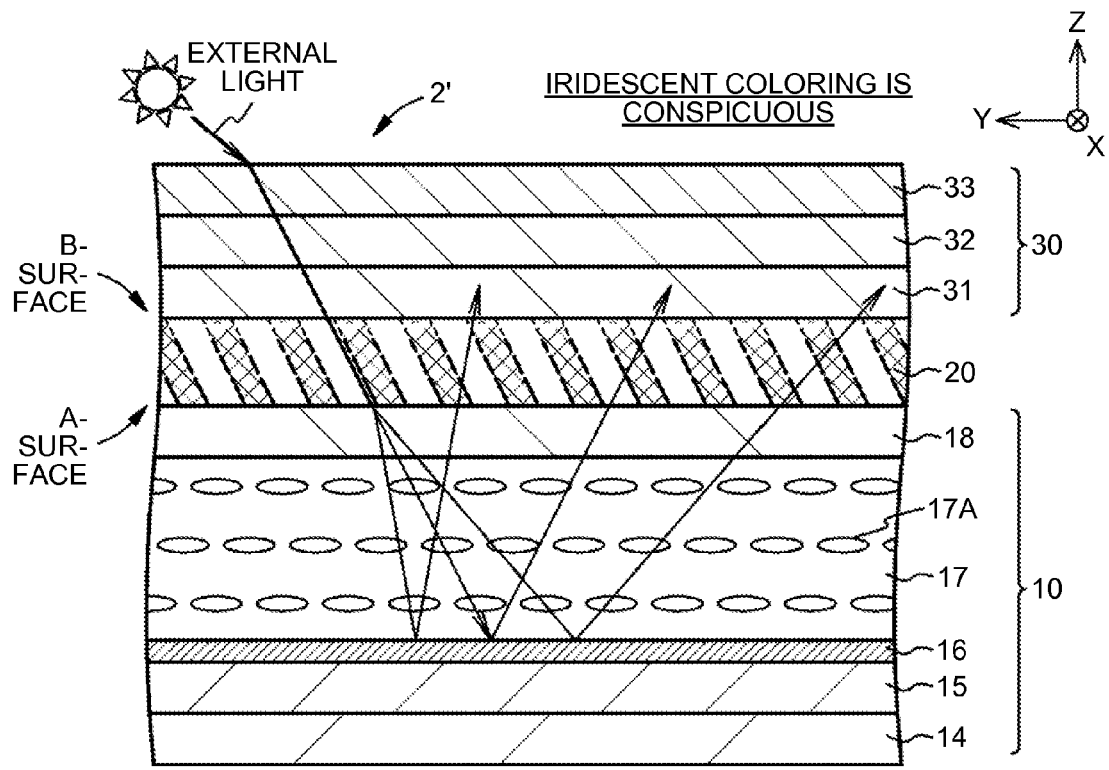
FIG. 12B is a schematic sectional view of a reflective image display unit according to a comparative embodiment.

By contrast, the following describes behavior of light in the case where the A-surface and the B-surface are switched in the anisotropic scattering member 20. The following describes behavior of light in an image display unit 2' according to a comparative embodiment in which the A-surface and the B-surface are switched in the anisotropic scattering member 20 with reference FIG. 12B.

In this case, the light incident from the outside exits as scattered light from the surface in which a change in the refractive index occurring near the boundary between the low refractive index area 21 and the high refractive index area 22 is relatively large. This renders iridescent coloring due to light interference caused by the microstructure conspicuous. The behavior from when the light thus scattered is reflected by the reflecting electrode 16 and to when the light travels toward the outside is the same as the behavior described above.

In the second embodiment, the anisotropic scattering member 20 is arranged so as to scatter the external light incident from the outside while the light is passing through the anisotropic scattering member. The light exits as scattered light from the surface in which a change in the refractive index occurring near the boundary between the low refractive index area 21 and the high refractive index area 22 is relatively small. This reduces iridescent coloring due to light interference caused by the microstructure.

The anisotropic scattering member 20 according to the second embodiment can reduce the risk that the image observer observes iridescence when satisfying $0.7<T(\theta-\phi)/T(\theta)\le 1$. This makes it possible to display a more preferable image to the image observer. Suppression of occurrence of iridescence at the angle $\theta-\phi$ can suppress occurrence of iridescence on the perpendicular line side of the display surface in which iridescence is made more conspicuous.

Third Embodiment

A third embodiment also relates to a display device according to the present disclosure.

The third embodiment is different from the first embodiment in that an anisotropic scattering member is formed by laminating a plurality of scattering members having different scattering characteristics.

A display device 300 according to the third embodiment has the same configuration as that of the first embodiment except for the structure of the anisotropic scattering member. Because the image display unit 1 in FIG. 1 can be considered as an image display unit 3 and the display device 100 can be considered as the display device 300, a schematic perpendicular view of the display device 300 according to the third embodiment is not given. Because the image display unit 1 can be considered as the image display unit 3 by changing the anisotropic scattering member 20 in FIG. 2A as appropriate, a schematic perpendicular view for explaining the configuration of the image display unit 3 according to the third embodiment is not given.

Figure 13:
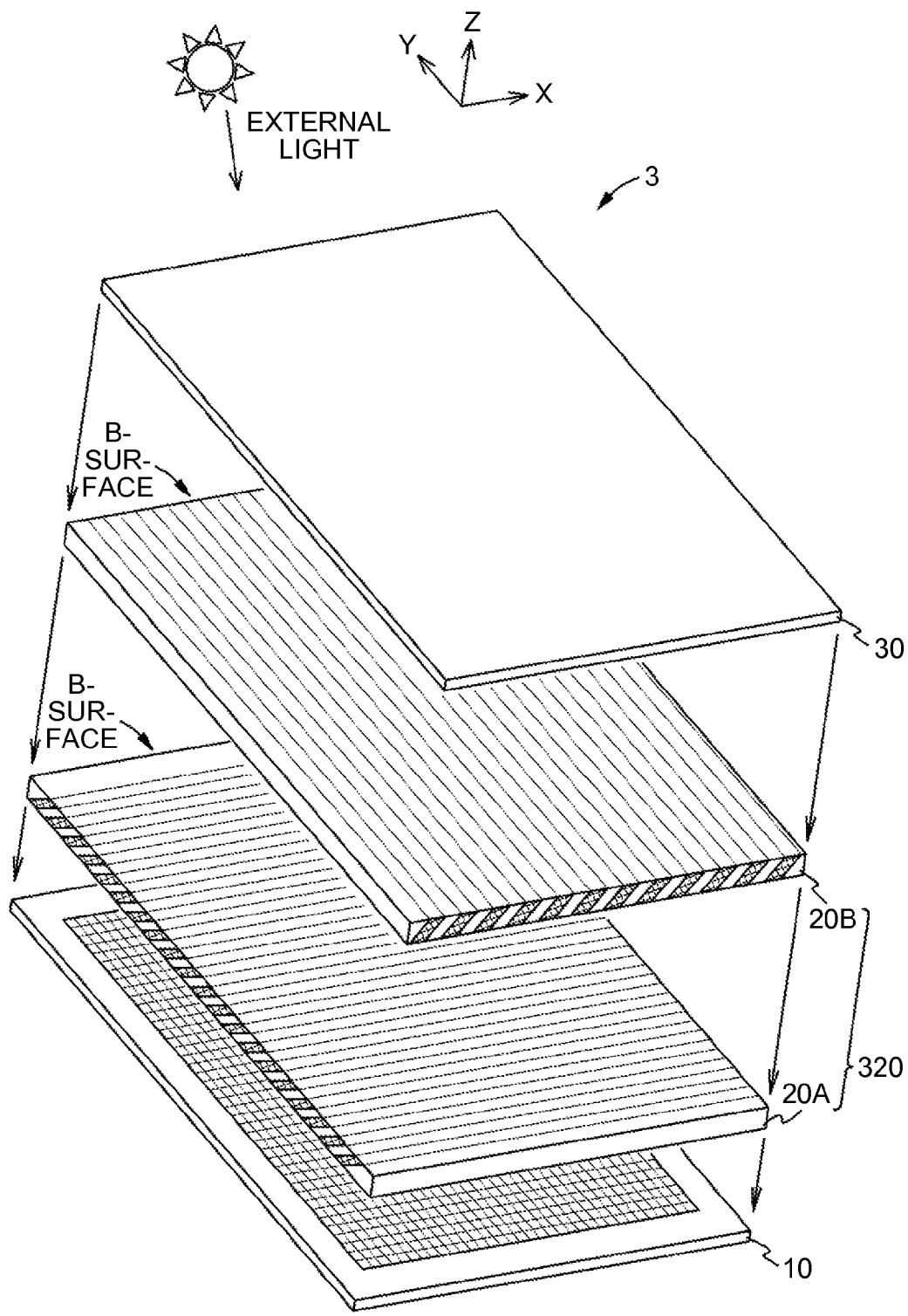
FIG. 13 is a schematic exploded perspective view of a reflective image display unit according to a third embodiment.

FIG. 13 is a schematic exploded perspective view of the reflective image display unit according to the third embodiment.

As illustrated in FIG. 13, the image display unit 3 is formed by laminating a scattering member 20A and a scattering member 20B. The structure and the arrangement of the scattering member 20A are the same as those of the anisotropic scattering member 20 described in the first embodiment.

The structure of the scattering member 20B is the same as that of the anisotropic scattering member 20 described in the first embodiment. The image display unit 3 is arranged such that the direction in which the louver structure is inclined in the scattering member 20B is orthogonal to the direction in which the louver structure is inclined in the scattering member 20A.

The scattering member 20A and the scattering member 20B are different in the direction of the scattering central axis and in the shape of the area in which light is scattered. An anisotropic scattering member 320 is formed by laminating a plurality of scattering members having different scattering characteristics.

Laminating a plurality of scattering members having different scattering characteristics can adjust the scattering range of light.

If an area in which light is scattered in the scattering member 20A has an elliptical shape with its longitudinal axis extending along the Y-axis, for example, an area in which light is scattered in the scattering member 20B has an elliptical shape with its longitudinal axis extending along the X-axis. By laminating the scattering members 20A and 20B, an area in which light is scattered has a substantially square and round shape. If the visual line moves up and down, or left and right to some extent, the image observer can observe an excellent image.

With the laminated scattering members satisfying $0.7<T(\theta-\phi)/T(\theta)\le 1$, the anisotropic scattering member 20 according to the third embodiment can reduce the risk that the image observer observes iridescence. This makes it possible to display a more preferable image to the image observer. Suppression of occurrence of iridescence at the angle $\theta-\phi$ can suppress occurrence of iridescence on the perpendicular line side of the display surface in which iridescence is made more conspicuous.

Fourth Embodiment

A fourth embodiment also relates to a display device according to the present disclosure.

The fourth embodiment is different from the first embodiment in that an anisotropic scattering member is formed by laminating a plurality of scattering members having different scattering characteristics.

A display device 400 according to the fourth embodiment has the same configuration as that of the first embodiment except for the structure of the anisotropic scattering member. Because the image display unit 1 in FIG. 1 can be considered as an image display unit 4 and the display device 100 can be considered as the display device 400, a schematic perpendicular view of the display device 400 according to the fourth embodiment is not given. Because the image display unit 1 can be considered as the image display unit 4 by changing the anisotropic scattering member 20 in FIG. 2A as appropriate, a schematic perpendicular view for explaining the configuration of the image display unit 4 according to the fourth embodiment is not given.

Figure 14:
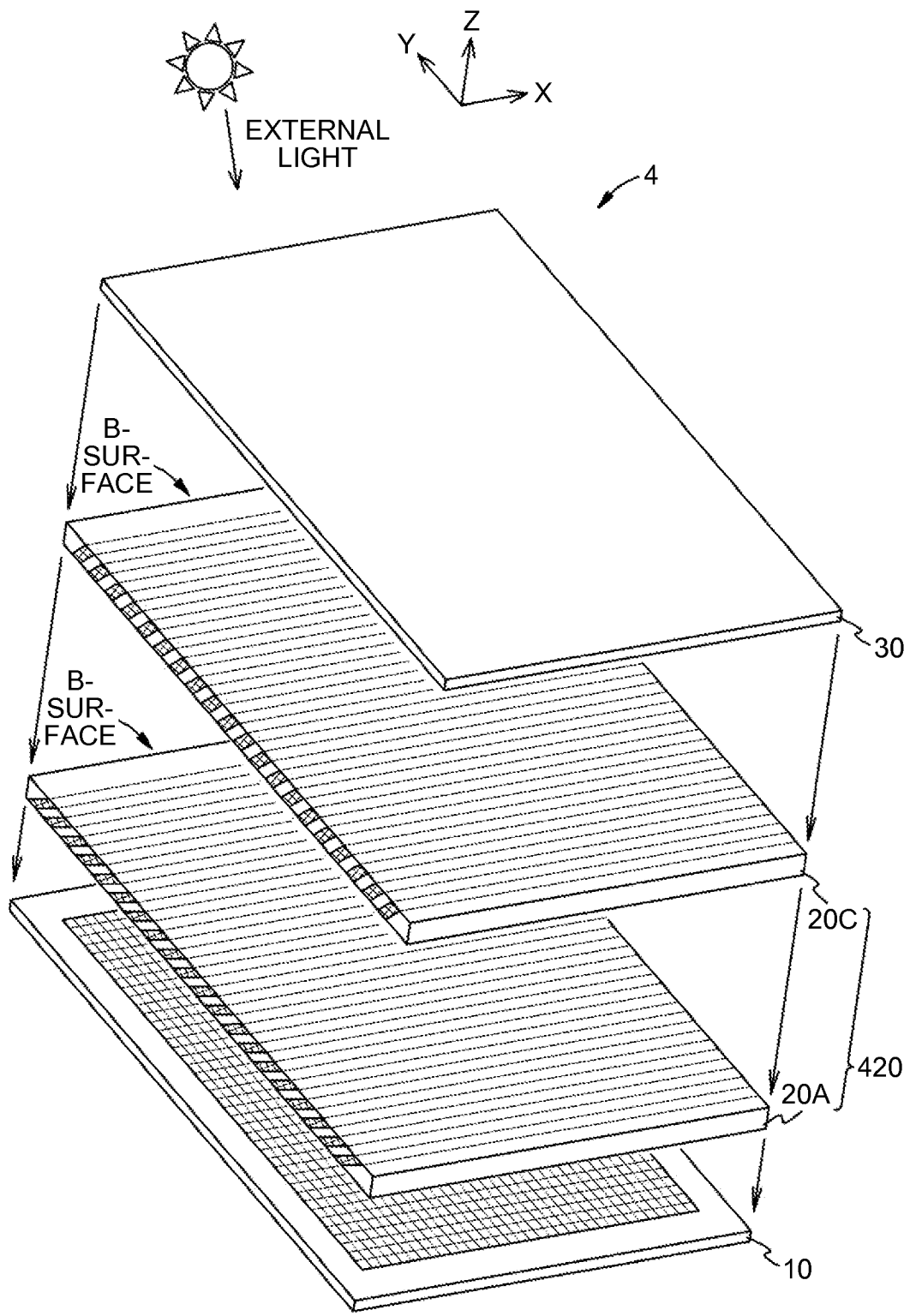
FIG. 14 is a schematic exploded perspective view of a reflective image display unit according to a fourth embodiment.

FIG. 14 is a schematic exploded perspective view illustrating the reflective image display unit according to the fourth embodiment.

As illustrated in FIG. 14, the image display unit 4 is formed by laminating a scattering member 20A and a scattering member 20C. The structure and the arrangement of the scattering member 20A are the same as those of the anisotropic scattering member 20 described in the first embodiment.

The structure of the scattering member 20C is the same as that of the anisotropic scattering member 20 described in the first embodiment except for the value of the angle α illustrated in FIG. 2B. The image display unit 4 is arranged such that the direction in which the louver structure is inclined in the scattering member 20C is along the direction in which the louver structure is inclined in the scattering member 20A.

Figure 15:
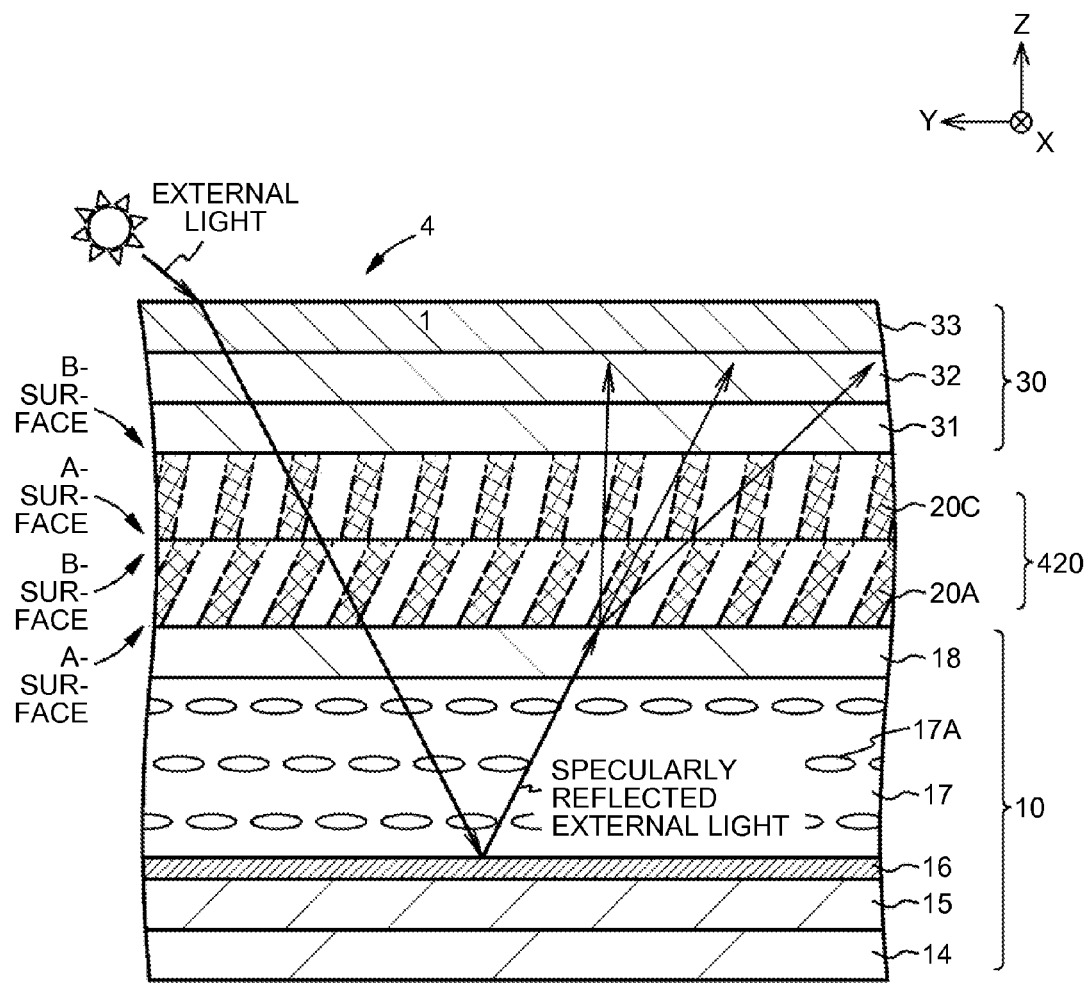
FIG. 15 is a schematic sectional view of the reflective image display unit according to the fourth embodiment.

FIG. 15 is a schematic sectional view illustrating the reflective image display unit according to the fourth embodiment.

The scattering member 20A and the scattering member 20C are different in the direction of the scattering central axis and in the shape of the area in which light is scattered. An anisotropic scattering member 420 is formed by laminating a plurality of scattering members having different scattering characteristics. Laminating a plurality of scattering members having different scattering characteristics can adjust the scattering range of light.

With the laminated scattering members satisfying $0.7<T(\theta-\phi)/T(\theta)\le 1$, the anisotropic scattering member 20 according to the fourth embodiment can reduce the risk that the image observer observes iridescence. This makes it possible to display a more preferable image to the image observer. Suppression of occurrence of iridescence at the angle $\theta-\phi$ can suppress occurrence of iridescence on the perpendicular line side of the display surface in which iridescence is made more conspicuous.

In a display device according to the present disclosure, the anisotropic scattering member is disposed so that a light enters from a first surface thereof and exits as scattered light from a second surface thereof, when an extent of refractive index difference at a boundary or vicinity thereof between the low refractive index area and the high refractive index area is relatively large in the first surface and relatively small in the second surface. Furthermore, the display device satisfies mathematical formulae, $$0.7 < T(\theta-\phi)/T(\theta) \leq 1$$

$$\theta < 0$$

wherein $2\phi$ represents a scattering angle range, $\theta$ represents a predetermined main incident angle of light entering the scattering member, T(a) represents a transmittance at a position on an extension line of an incident direction of the light with an incident angle "a". Owing to such features, it is possible to reduce the iridescence problem such as rainbow-colored glare, which may occur due to optical interference caused by a microstructure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, although the anisotropic scattering member is disposed between the front substrate 18 and the quarter-wave plate 31 in aforementioned respective embodiments, this is not exclusive. The arrangement position of the anisotropic scattering member may be determined as appropriate depending on the design and the specifications of the display device.

The technology of the present disclosure may employ the following configurations.

(1). A display device comprising
a reflective image display unit including a sheet-like anisotropic scattering member, wherein
the sheet-like anisotropic scattering member has a surface in which both a low refractive index area and a high refractive index area exist,
the sheet-like anisotropic scattering member is disposed so that a light enters from a first surface of the sheet-like anisotropic scattering member and the light entered from the first surface of the sheet-like anisotropic scattering member exits as scattered light from a second surface of the sheet-like anisotropic scattering member,
the first surface has a relatively large difference of refractive index between the low refractive index area and the high refractive index area,
the second surface has a relatively small difference of refractive index between the low refractive index area and the high refractive index area, and
the display device satisfies mathematical formulae, $$0.7 < T(\theta-\phi)/T(\theta) \leq 1$$

$$\theta < 0$$

wherein $2\phi$ represents a scattering angle range, $\theta$ represents a predetermined main incident angle of light entering the scattering member, T(a) represents a transmittance at a position on an extension line of an incident direction of the light with an incident angle "a".

(2). The display device according to (1), wherein
the main incident angle $\theta$ is not less than −40 degrees and not more than −20 degrees.
(3). The display device according to (2), wherein
the sheet-like anisotropic scattering member satisfies a relationship represented by a mathematical formula, $$|\theta|-\phi < 0$$

wherein $\theta$ represents the main incident angle and $2\phi$ represents the scattering angle range.
(4). The display device according to (1), wherein
the scattering angle range $2\phi$ is not less than 50 degrees and not more than 90 degrees.
(5). The display device according to (1), wherein
the sheet-like anisotropic scattering member is disposed so that the scattered light is emitted when a light reflected in the image display unit passes through the sheet-like anisotropic scattering member.
(6). The display device according to (1), wherein
the sheet-like anisotropic scattering member is disposed so that the scattered light is emitted when an incident light from outside passes through the sheet-like anisotropic scattering member.
(7). The display device according to (1), wherein
the image display unit comprises a reflective liquid crystal display panel including a front substrate, a back substrate, and a liquid crystal material layer therebetween, and
the sheet-like anisotropic scattering member is disposed at a front substrate side of the reflective liquid crystal display panel.
(8). The display device according to (1), wherein
the sheet-like anisotropic scattering member includes a plurality of scattering members having different scattering characteristics, the plurality of scattering members being stacked or laminated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a reflective image display unit that reflects external light on a reflecting part; and
an anisotropic scattering member disposed on the reflecting part,
wherein the anisotropic scattering member
transmits external light incident at an incident angle $\theta$, toward the reflecting part,
transmits the external light reflected by the reflecting part, and
emits the transmitted external light to scatter in a range from $|\theta|-\phi$ to $|\theta|+\phi$ around a direction of angle $\theta$ such that a transmittance of the reflected light through the anisotropic scattering member in a range from $|\theta|-\phi$ to $|\theta|$ is no more than 10%, and
wherein $2\phi$ represents a scattering angle range, and $\theta$ represents a predetermined main incident angle of light entering the scattering member.

2. The display device according to claim 1, wherein
the display device satisfies mathematical formulae, $$0.7 < T(\theta-\phi)/T(\theta) \leq 1$$

$$\theta < 0$$

wherein T(a) represents a transmittance at a position on an extension line of an incident direction of the light with an incident angle (a).

3. The display device according to claim 1, wherein the anisotropic scattering member has a surface in which both a low refractive index area and a high refractive index area exist.

4. The display device according to claim 3, wherein the anisotropic scattering member is disposed so that a light enters from a first surface of the anisotropic scattering member and exits as scattered light from a second surface of the anisotropic scattering member, when an extent of refractive index difference at a boundary or vicinity thereof between the low refractive index area and the high refractive index area is relatively large in the first surface and relatively small in the second surface.

5. The display device according to claim 2, wherein the main incident angle θ is not less than −40 degrees and not more than −20 degrees.

6. The display device according to claim 5, wherein the sheet-like anisotropic scattering member satisfies a relationship represented by a mathematical formula, $$|\theta|-\phi<0.$$

7. The display device according to claim 1, wherein the scattering angle range 2φ is not less than 50 degrees and not more than 90 degrees.

8. The display device according to claim 1, wherein the sheet-like anisotropic scattering member is disposed so that the scattered light is emitted when a light reflected in the image display unit passes through the sheet-like anisotropic scattering member.

9. The display device according to claim 1, wherein the sheet-like anisotropic scattering member is disposed so that the scattered light is emitted when an incident light from outside passes through the sheet-like anisotropic scattering member.

10. The display device according to claim 1, wherein the image display unit comprises a reflective liquid crystal display panel including a front substrate, a back substrate, and a liquid crystal material layer therebetween, and
the sheet-like anisotropic scattering member is disposed at a front substrate side of the reflective liquid crystal display panel.

11. The display device according to claim 1, wherein the sheet-like anisotropic scattering member includes a plurality of scattering members having different scattering characteristics, the plurality of scattering members being stacked or laminated.

12. The display device according to claim 1,
wherein the transmittance of the reflected light through the anisotropic scattering member is no more than 5% in a first range from $|\theta|-\phi$ to $|\theta|$ and more than 5% in a range excluding the first range.

13. An anisotropic scattering member, which is configured to
transmit external light incident at an incident angle θ, toward the reflecting part,
transmit the external light reflected by a reflecting part, and
emit the transmitted external light to scatter in a range from $|\theta|-\phi$ to $|\theta|+\phi$ around a direction of angle θ such that a transmittance of the reflected light through the anisotropic scattering member in a range from $|\theta|-\phi$ to $|\theta|$ is no more than 10%;
wherein 2φ represents a scattering angle range, θ represents a predetermined main incident angle of light entering the scattering member.

* * * * *